United States Patent
Krauss

(10) Patent No.: US 11,068,750 B1
(45) Date of Patent: Jul. 20, 2021

(54) TESTING AND EVALUATING DETECTION PROCESS BY DATA AUGMENTATION

(71) Applicant: The Government of the United States of America, as represented by the Secretary of Homeland Security, Washington, DC (US)

(72) Inventor: Ronald A. Krauss, Galloway, NJ (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 17/091,495

(22) Filed: Nov. 6, 2020

Related U.S. Application Data

(60) Provisional application No. 63/001,658, filed on Mar. 30, 2020.

(51) Int. Cl.
| | | |
|---|---|---|
| *G06K 9/62* | (2006.01) | |
| *G06T 3/00* | (2006.01) | |
| *G06T 3/40* | (2006.01) | |
| *G06T 7/70* | (2017.01) | |
| *G06T 11/00* | (2006.01) | |

(52) U.S. Cl.
CPC .......... *G06K 9/6262* (2013.01); *G06T 3/0093* (2013.01); *G06T 3/40* (2013.01); *G06T 7/70* (2017.01); *G06T 11/001* (2013.01)

(58) Field of Classification Search
CPC ....... G06K 9/6262; G06T 11/001; G06T 7/70; G06T 3/0093; G06T 3/40
See application file for complete search history.

(56) References Cited

U.S. PATENT DOCUMENTS

| | | | |
|---|---|---|---|
| 10,235,601 B1* | 3/2019 | Wrenninge | G06K 9/6256 |
| 10,410,089 B2* | 9/2019 | Szeto | G06T 7/00 |
| 10,841,486 B2* | 11/2020 | Kolesov | H04N 5/23222 |
| 2016/0188937 A1* | 6/2016 | Tyrrell | G01N 35/00029 |
| | | | 382/128 |
| 2019/0197358 A1* | 6/2019 | Madani | G06N 3/0481 |
| 2019/0197368 A1* | 6/2019 | Madani | G06K 9/627 |
| 2019/0198156 A1* | 6/2019 | Madani | G16H 50/70 |

(Continued)

OTHER PUBLICATIONS

Goodfellow et al., "Generative Adversarial Nets", (Year: 2014).*

*Primary Examiner* — Aaron W Carter
(74) *Attorney, Agent, or Firm* — Lavanya Ratnam; Kelly Hyndman

(57) ABSTRACT

In an example, a method includes: based on a starting set of real image data of a set of one or more original images obtained using a detection process of a detection system, identifying elements of the real image data which are picture or volume elements; performing data augmentation on the identified elements to produce one or more augmented images; replacing the set of one or more original images with a set of the one or more augmented images; analyzing the set of one or more augmented images (which may be supplemented with additional real data) using the detection process; and evaluating a detection response of the detection system for each augmented image of the set of one or more augmented images. The analyzing and evaluating may be performed by using an emulator for the detection system which was used to obtain the one or more original images.

23 Claims, 37 Drawing Sheets

(56) References Cited

U.S. PATENT DOCUMENTS

| | | | |
|---|---|---|---|
| 2019/0251612 A1* | 8/2019 | Fang | G06N 3/08 |
| 2019/0332850 A1* | 10/2019 | Sharma | G06K 9/00308 |
| 2020/0372694 A1* | 11/2020 | Hwang | G06N 20/00 |
| 2021/0073972 A1* | 3/2021 | Wu | G06N 20/00 |

* cited by examiner

TABLE 1

| Fit Threshold | Mean CTN | CTN standard deviation |
|---|---|---|
| 0 (see *Figure 3*) | 990 | 146 |
| 975 (*Figure 5*) | 1032 | 23 |

TABLE 2

| orig bag# | file | step | threshold | mean | stdev | meanshift | threshold | mean | stdev | meanshift |
|---|---|---|---|---|---|---|---|---|---|---|
| 450 | n/a | n/a | 0 | 1135 | 132 | n/a | 1075 | 1168 | 32 | n/a |
|  | 1 | 1 | 0 | 1416 | 172 | 24.8% | 1325 | 1459 | 50 | 24.9% |
|  | 2 | 2 | 0 | 1698 | 218 | 49.6% | 1525 | 1748 | 79 | 49.7% |
| 452 | n/a | n/a | 0 | 1290 | 163 | n/a | 1250 | 1331 | 31 | n/a |
|  | 3 | 1 | 0 | 1607 | 217 | 24.6% | 1425 | 1656 | 60 | 24.4% |
|  | 4 | 2 | 0 | 1926 | 274 | 49.3% | 1750 | 1990 | 86 | 49.5% |
| 454 | n/a | n/a | 0 | 1284 | 161 | n/a | 1225 | 1322 | 31 | n/a |
|  | 5 | 1 | 0 | 1601 | 212 | 24.7% | 1450 | 1649 | 56 | 24.7% |
|  | 6 | 2 | 0 | 1919 | 267 | 49.5% | 1775 | 1962 | 81 | 48.4% |
| 456 | n/a | n/a | 0 | 1405 | 198 | n/a | 1350 | 1458 | 34 | n/a |
|  | 7 | 1 | 0 | 1753 | 254 | 24.8% | 1625 | 1819 | 60 | 24.8% |
|  | 8 | 2 | 0 | 2100 | 319 | 49.5% | 1900 | 2182 | 94 | 49.7% |

FIG. 10

TABLE 3

| qqg bag | bag | step | threshold | Shift by -100, 3 steps | | | Shift by +10, 2 steps | | |
|---|---|---|---|---|---|---|---|---|---|
| | | | | mean | stdev | meanshift | mean | stdev | meanshift |
| 445 | n/a | n/a | 0 | 990 | 146 | n/a | 990 | 146 | n/a |
| | 1 | 1 | 0 | 893 | 136 | -97 | 1000 | 145 | 10 |
| | 2 | 2 | 0 | 795 | 129 | -195 | 1010 | 146 | 20 |
| | 3 | 3 | 0 | 700 | 114 | -290 | | | |
| 446 | n/a | n/a | 0 | 1035 | 150 | n/a | 1035 | 150 | n/a |
| | 4 | 1 | 0 | 936 | 146 | -99 | 1044 | 152 | 9 |
| | 5 | 2 | 0 | 839 | 138 | -196 | 1054 | 152 | 19 |
| | 6 | 3 | 0 | 746 | 122 | -289 | | | |
| 448 | n/a | n/a | 0 | 1046 | 132 | n/a | 1046 | 132 | n/a |
| | 7 | 1 | 0 | 947 | 128 | -99 | 1056 | 134 | 10 |
| | 8 | 2 | 0 | 850 | 121 | -196 | 1065 | 136 | 19 |
| | 9 | 3 | 0 | 755 | 108 | -291 | | | |
| 449 | n/a | n/a | 0 | 1235 | 175 | n/a | 1235 | 175 | n/a |

FIG. 11

TABLE 4

| Orig bag | bag | thresh | mean | st. dev. | RSD | thresh | mean | st. dev. | RSD |
|---|---|---|---|---|---|---|---|---|---|
| | | | original | | | | smoothed | | |
| 445 | 1 | 0 | 990 | 146 | 14.7% | 0 | 990 | 143 | 14.4% |
| 446 | 2 | 0 | 1035 | 150 | 14.5% | 0 | 1037 | 139 | 13.4% |
| 448 | 3 | 0 | 1046 | 132 | 12.6% | 0 | 1047 | 126 | 12.0% |
| 449 | 4 | 0 | 1235 | 175 | 14.2% | 0 | 1236 | 165 | 13.3% |
| 445 | 1 | 975 | 1032 | 23 | 2.2% | 1000 | 1031 | 13 | 1.3% |
| 446 | 2 | 1000 | 1081 | 30 | 2.8% | 1000 | 1076 | 24 | 2.2% |
| 448 | 3 | 1025 | 1085 | 26 | 2.4% | 1025 | 1079 | 19 | 1.8% |
| 449 | 4 | 1200 | 1288 | 35 | 2.7% | 1200 | 1281 | 27 | 2.1% |

TABLE 5

| bag# | fit_thresh | app_thres | mean | stdev |
|---|---|---|---|---|
| 1 | 0 | 0 | 986 | 92 |
| 2 | 600 | 0 | 1010 | 66 |
| 3 | 900 | 0 | 1022 | 61 |
| 4 | 975 | 0 | 1027 | 60 |
| 5 | 1050 | 0 | 1057 | 62 |
| 6 | 0 | 100 | 981 | 112 |
| 7 | 0 | 250 | 976 | 130 |
| 8 | 0 | 500 | 968 | 146 |
| 9 | 0 | 900 | 955 | 155 |
| 10 | 0 | 975 | 952 | 154 |
| 11 | 600 | 100 | 1005 | 94 |
| 12 | 600 | 500 | 991 | 135 |
| 13 | 600 | 975 | 973 | 147 |
| 14 | 975 | 100 | 1023 | 91 |
| 15 | 975 | 500 | 1008 | 135 |
| 16 | 975 | 975 | 989 | 149 |

TESTING AND EVALUATING DETECTION PROCESS BY DATA AUGMENTATION

CROSS-REFERENCE TO RELATED APPLICATIONS

The application claims the benefit of priority from U.S. Provisional Patent Application No. 63/001,658, filed on Mar. 30, 2020, entitled TESTING AND EVALUATING DETECTION PROCESS BY DATA AUGMENTATION, the disclosure of which is incorporated by reference in its entirety.

SUMMARY STATEMENT OF GOVERNMENT INTEREST

The present invention was made by employees of the United States Department of Homeland Security in the performance of their official duties. The U.S. Government has certain rights in this invention.

FIELD

The discussion below relates generally to systems and methods of testing and evaluating devices and, more particularly, to testing and evaluating security screening devices by data augmentation.

BACKGROUND

Security screening technologies are tested for the presence or absence of threat quantities of explosives and other prohibited materials. The test and evaluation of such technologies involve the generation of two-dimensional or three-dimensional maps of some form of signal that is associated with the interaction of a particular type of penetrating radiation with threat materials. In the case of X-ray screening, a common practice for screening technologies is to generate a three-dimensional map of attenuation at one or more effective X-ray energies.

SUMMARY

The attenuation or other signature maps which are generated by screening technologies are typically processed through automatic classification and detection algorithms that have been trained using data acquired using real threat materials. These algorithms are normally tested for detection performance using real threat materials or threat simulants, which are still real materials. Given that the material property values, or feature spaces, associated with threats which should be detected, can be studied and restricted to particular regions or zones, the actual training or test materials may only fall within limited subspaces of the total threat feature space. It is quite possible that a different type of threat which was not in the training data, or some modified threat, could be presented to the screening system in an operational environment. Without some way of testing that different or altered threat, there is uncertainty associated with the detection performance of a given algorithm for that threat. For example, if the training data consisted of four threats that form a rectangle in a particular two-dimensional feature space, then a fifth threat which falls in the center of that rectangle may have a different detection rate, which would remain unknown unless one tested the detection performance with that fifth threat material.

Additionally, there could be detection performance variation from machine to machine of the same model, whether due to calibration (or lack thereof), hardware problems, environmental fluctuations, etc. Detection test performance tends to be based on a single machine at the test facility, and there is otherwise no effective way to determine the variation of detection performance associated with variation in the detection machine's response due to such machine-to-machine variation.

Embodiments of the present invention are directed to apparatuses and methods for synthesizing supplementary data which can be used to determine the detection performance of screening system automated target recognition software with far greater accuracy by data augmentation. This methodology is extremely efficient compared to either testing with real threat materials throughout the feature spaces or testing with multiple machines to assess detection performance variation associated with machine-to-machine variation. It is also much less complex than fully synthetic data generation, which would include simulation of the system, the radiation generation and interaction process, the collection of radiation and generation of signal data, the anomalous materials and everything else of interest (such as passenger baggage), variation of signal detector geometry to generate synthetic projection data, and the reconstruction into two- and three-dimensional synthetic images.

Instead, embodiments of the present method are based on collecting real data and then modifying it in some way to emulate the response that might result due to different materials, structures, or properties, or due to other effects.

Embodiments of the methodology have certain characteristics. First, the methodology starts with real data collected using a real threat or simulant or otherwise innocuous material. Second, the method reproduces or generates the same types of data that are utilized by the detection algorithm. For example, if raw sinogram projection images are used by the detection algorithm, then this method will need to generate those projection images for that algorithm or system. Additional considerations are needed in a system that utilizes more than the reconstructed 3D images in its detection algorithms and in a system that utilizes projection images in the final detection analysis.

In accordance with an aspect of the present invention, a method comprises: based on a starting set of real image data of a set of one or more original images obtained using a detection process of a detection system, identifying elements of the real image data which are picture or volume elements; performing data augmentation on the identified elements to produce one or more augmented images; replacing the set of one or more original images with a set of the one or more augmented images; analyzing the set of one or more augmented images using the detection process; and evaluating a detection response of the detection system for each augmented image of the set of one or more augmented images.

In accordance with another aspect of the invention, a system comprising: an emulator for a detection system which performs a detection process to obtain a set of one or more original images; and a data augmentation device configured, based on a starting set of real image data of the set of the one or more original images, to identify elements of the real image data which are picture or volume elements, and perform data augmentation on the identified elements to produce one or more augmented images. The emulator is configured to replace the set of one or more original images with a set of the one or more augmented images, analyze the set of one or more augmented images using the detection process, and evaluate a detection response of the detection system for each augmented image of the set of one or more augmented images.

Another aspect of this invention is directed to a non-transitory computer readable storage medium having stored thereon software instructions that are executable by a processor to cause the processor to perform the following: based on a starting set of real image data of a set of one or more original images obtained using a detection process of a detection system, identifying elements of the real image data which are picture or volume elements; performing data augmentation on the identified elements to produce one or more augmented images; replacing the set of one or more original images with a set of the one or more augmented images; analyzing the set of one or more augmented images using the detection process; and evaluating a detection response of the detection system for each augmented image of the set of one or more augmented images.

Other features and aspects of various examples and embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

FIG. 10 shows Table 2 containing an example of the results of augmentation shifting the CTN data by a percentage.

FIG. 11 shows Table 3 containing an example of the results of augmentation shifting the CTN data by an absolute amount.

FIG. 13 shows Table 4 containing examples of the effects of smoothing the CTN data.

FIG. 18 shows Table 5 containing mean and standard deviation of augmented data for various fit thresholds (applied in the fit prior to augmentation) and for various application thresholds.

FIG. 23A shows an example slice of one of the scans and FIG. 23B the corresponding slice from the distorted data.

FIG. 28A shows the original CTN histogram, FIG. 28B shows the CTN histogram under the effect of decreasing gradient, and FIG. 28C shows the CTN histogram under the effect of increasing gradient.

DETAILED DESCRIPTION

A number of examples or embodiments of the present invention are described, and it should be appreciated that the present invention provides many applicable inventive concepts that can be embodied in a variety of ways. The embodiments discussed herein are merely illustrative of ways to make and use the invention and are not intended to limit the scope of the invention. Rather, as will be appreciated by one of skill in the art, the teachings and disclosures herein can be combined or rearranged with other portions of this disclosure along with the knowledge of one of ordinary skill in the art.

According to some embodiments, the methodology starts with real data collected using a real threat or simulant or otherwise innocuous material. Next, the method reproduces or generates the same types of data that are utilized by the detection algorithm. For example, if raw sinogram projection images are used by the detection algorithm, then this method will need to generate those projection images for that algorithm or system.

Process Employing Data Augmentation Methodology

Figure 1:
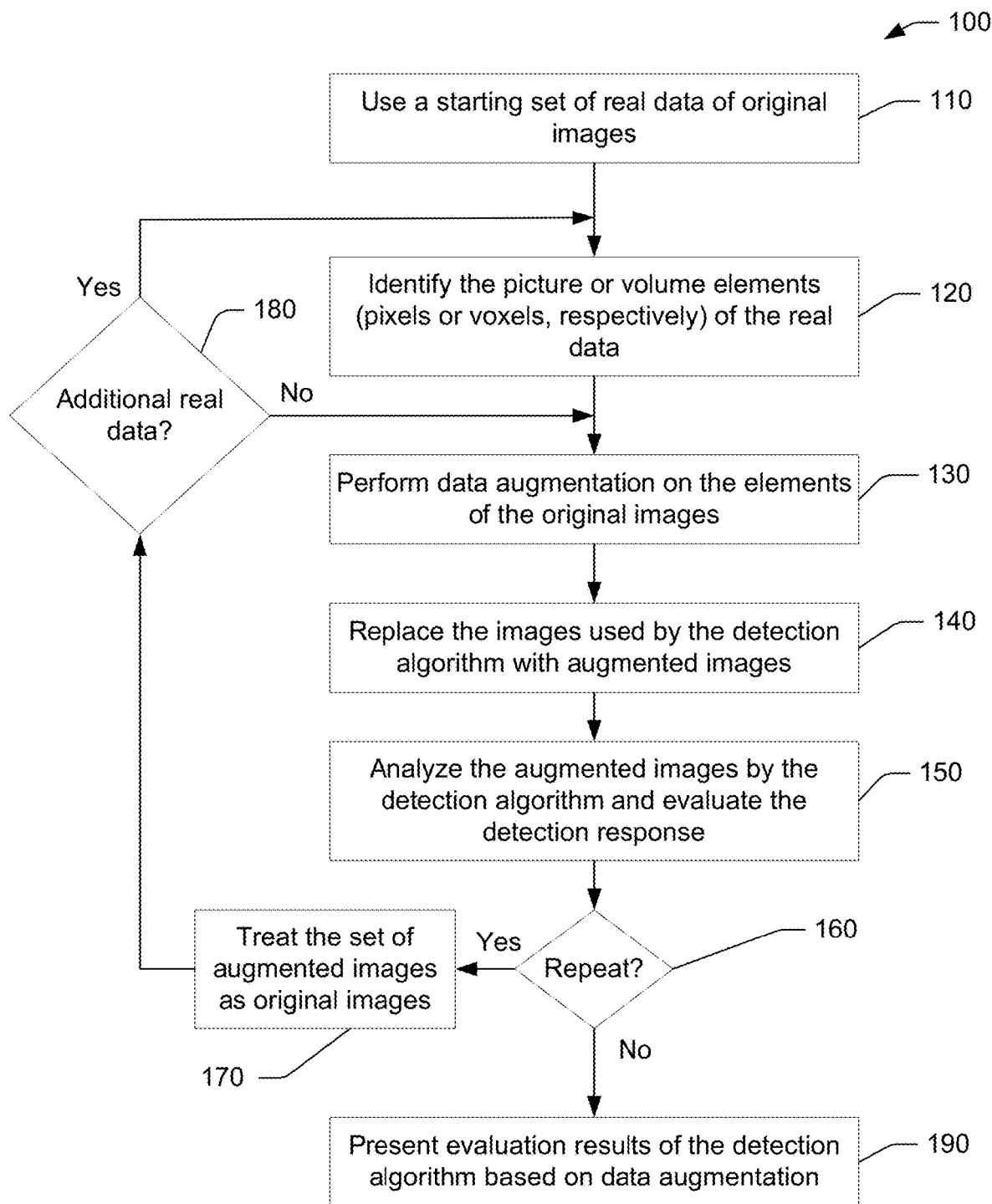
FIG. 1 shows an example of a flow diagram illustrating a process of testing and evaluating a detection algorithm by data augmentation.

FIG. 1 shows an example of a flow diagram 100 illustrating a process of testing and evaluating a detection algorithm by data augmentation. The process utilizes a starting set of real data (step 110). The real data may include a starting set of real image data of a set of one or more original images obtained using a detection process of a detection system. Given that it would be known precisely where the threat material is located and its shape, as well as its known attenuation/interaction properties, this data is utilized as "ground truth" data. The methodology can either utilize a fully or semi-automatic segmentation technique, or employ a fully manual method, to identify elements of the real data, which may include the picture or volume elements (pixels or voxels, respectively) of the set of one or more original images corresponding to the threat (step 120). After the threat object's pixels are identified, the methodology will proceed to data augmentation on the identified elements to produce one or more augmented images (step 130).

There are several different types of augmentation which could be utilized. The features from the pixels will be characterized, and they will generally have some statistical distribution associated with them. This distribution can be used to generate completely new pixel values any number of times. The pixel values can be shifted either lower or higher by any amount, perhaps a fixed amount, or a percentage of the mean value, or a percentage of the original pixel value. Or, the pixel values could be augmented by smoothing, which reduces noise, or by adding noise. Such addition of noise could fall into a more general technique of adding image texture, which could be associated with real texture in a threat or could be associated with artificial features associated with the image reconstruction. The latter could take the form of streaks or beam hardening artifacts which are commonly associated with X-ray screening technologies. This method could also add image artifacts associated with hardware issues, such as ring artifacts due to dead or "hot" detector elements.

Depending on how many features are derived from the original data, the main goal is to replace the set of one or more original images used by the algorithm with a set of one or more augmented images (step 140). The pixel values in those images can be changed in a variety of ways, where the mean pixel value, the statistical distribution, or the spatial distribution of pixel values, may all be changed by an arbitrary amount.

For each image or set of images associated with a single scan of a threat material, a plurality of augmented images can be constructed. Those augmented images would then be analyzed by the detection algorithm using the detection process, and the detection response evaluated (step 150). This process can then be repeated (decision step 160), where the set of one or more augmented images is treated as the set of one or more original images (step 170), and then each of those images is run through the augmentation process, for example, by repeating the steps of performing data augmentation on the elements of the set of one or more original images to produce a set of one or more augmented images (130), replacing the set of one or more original images with the set of one or more augmented images (140), analyzing the set, and evaluating the detection response (150). Depending on the range of threat materials desired to be evaluated, this methodology can take a very limited set of data and effectively synthesize orders of magnitude more data from closely related but hypothetical materials to evaluate the detection algorithm response with high efficiency.

In an embodiment, analyzing the set of one or more augmented images using the detection process and evaluating the detection response of the detection system include analyzing the set of one or more augmented images and evaluating the detection response of the detection system using an emulator (e.g., 2930 in FIG. 29) for the detection system which was used to obtain the one or more original images, for each augmented image of the set of one or more augmented images.

In addition, the augmented data can be supplemented by additional real data (180), which can then also be processed through the augmentation methodology. For example, after treating the set of one or more augmented images as the set of one or more original images (170) and prior to repeating steps 130-150, supplementing the set of one or more original images with additional real image data and identifying picture or volume elements of the additional real image data (180). As a result, the testing agency can utilize this methodology to test the detection algorithm against a virtual plethora of potential threat materials and conditions, which may correspond to real possibilities, either in terms of actual threat materials, actual image artifacts, or actual material texture. Instead of assuming that an algorithm is effective between actual tested threat materials in feature space, the performance of the algorithm throughout the feature space can be tested relatively easily and quickly (assuming certain preconditions are met as described above). The final step is the evaluation of the detection algorithm using the data that has gone through the augmentation process (step 190), for example, by evaluating a detection response of the detection system for each augmented image of the set of one or more augmented images.

In an embodiment, the detection process is used to detect an object. Performing data augmentation comprises simulating a change of one or more characteristics of the object to test an effect on detection. The detection of the object produces an object detection response out of a plurality of object detection responses. As discussed above, the method may include treating the set of one or more augmented images as the set of one or more original images (170) and, furthermore, may include repeating the steps of performing data augmentation on the elements of the set of one or more original images to produce a set of one or more augmented images (130), replacing the set of one or more original images with the set of one or more augmented images (140), analyzing the set, and evaluating the detection response (150), until the object detection response produced is changed from a first object detection response to a second object detection response, indicating a transition between different types of object detection responses (as described below). Performing data augmentation may include, for example, inserting image texture or artifacts artificially into the detection process to test an effect on detection or distorting the set of one or more original images to test an effect on detection. Distorting the set of one or more original images may include distorting at least one of color, shape, or size of the set of one or more original images (as described below).

Figure 2:
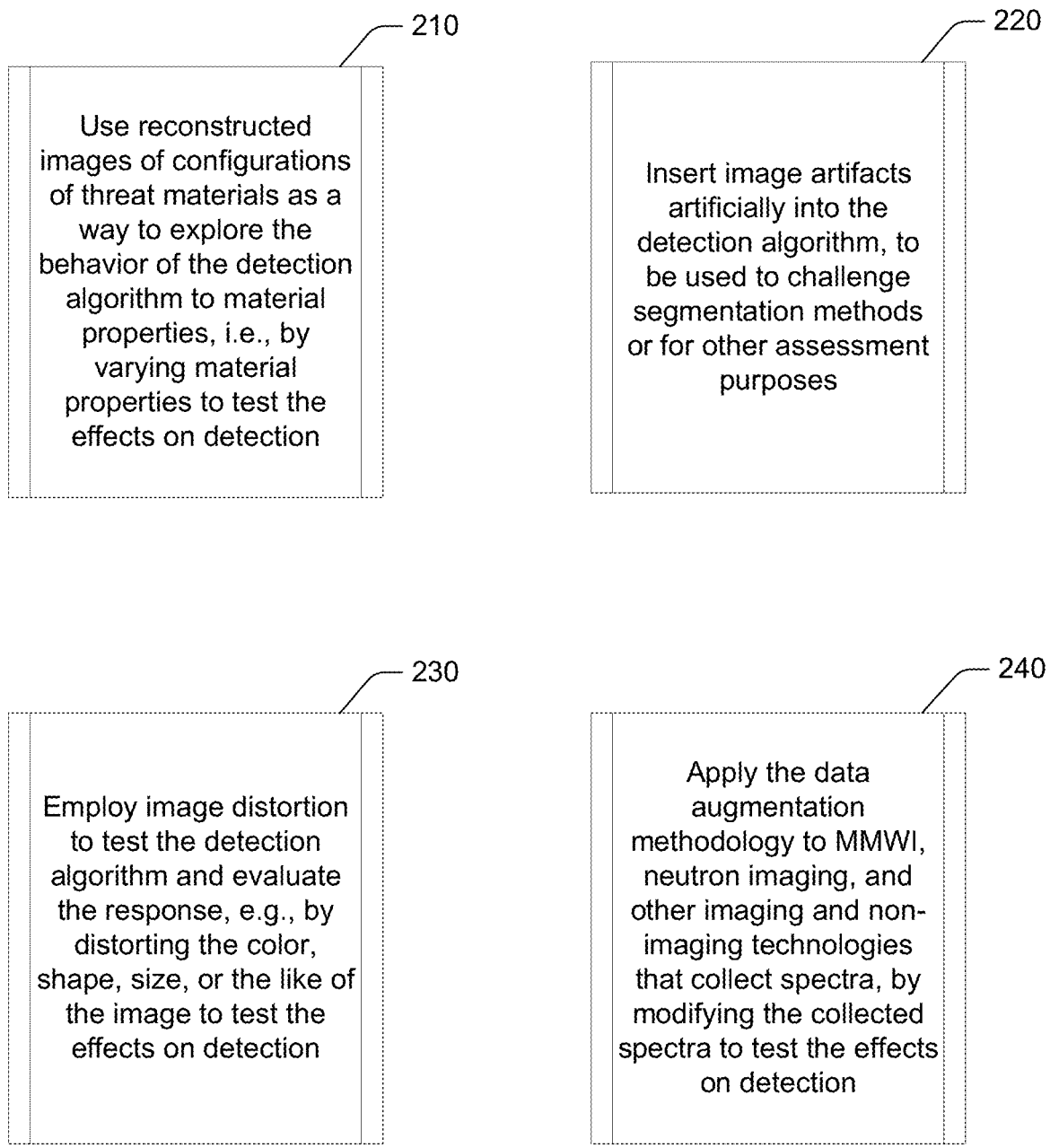
FIG. 2 shows examples of applying the process of FIG. 1.

FIG. 2 shows varieties of applying the process of FIG. 1. The present methodology is not intended to replace synthetic data generation, such as those algorithmic methods that fully simulate threats, baggage, concealments, and detection systems using Monte Carlo or other computationally intensive methods. In some embodiments, this methodology is applied only to use reconstructed images of fairly simple configurations of threat materials as a means to explore the behavior of the detection algorithms to material properties (210), but not primarily as a way to challenge the segmentation of those algorithms. Fully synthetic methods to simulate baggage and the resulting images can achieve such alternative testing. On the other hand, the present methodology in specific embodiments could be used to insert image artifacts artificially, which could challenge segmentation methods, or be used for other assessment purposes (220). In addition, complex images obtained with real materials can still be augmented, as long as ground truth can be established, i.e., as long as the pixels/voxels associated with the test material can be identified.

In some embodiments, the methodology employs image distortion to test the detection algorithm and evaluate the response (230). In Photoshop™ software, there is the capability to take images and distort them. This distortion could be a spatial distortion, i.e., it could change the shape of an object, or it could distort the color of an object. This methodology, in some embodiments as described above, is analogous to changing the color of an object in Photoshop™, but the same concept of changing shapes can also be implemented if desired. For example, if the original threat object was a mass equivalent to one (arbitrary) threat mass unit, the images could be distorted in size to make the mass appear to be smaller or larger than the original amount. In much the same way as this methodology can be used to test the threat properties continuously through the feature space, it could also be used to test the sensitivity of the detection algorithms to threat mass, or to sheet explosive thickness. Any intervening materials would have to be distorted, removed, or replaced, and the pixel values might need some form of interpolation.

Furthermore, the concepts described herein can be applied to millimeter wave imaging (MMWI), neutron imaging, and even non-imaging technologies that collect spectra (240). For example, spectra which are collected by a given screening technology could be modified to test the effects on detection. Of course, the data modification or augmentation should be accomplished in a realistic way, but this can be used to test the effects of mixing signatures from different materials, or adding noise, or smoothing, or removing partial data, such as might occur with X-ray diffraction due to beam hardening or self-attenuation, yet without the need to collect additional real data.

In the growing realm of "big data," the possibility of sophisticated detection algorithms which utilize machine learning is already occurring. Advantageously, the present methodology can be used to meet a growing need for far more training data for these algorithms. In addition, because some types of machine learning or artificial intelligence algorithms cannot easily be explained in terms of specific features of bags or materials, there is a growing need for more thorough testing capabilities. This methodology can be used to more thoroughly test detection algorithms with high efficiency compared to actually performing all of the scans in a laboratory as a hazardous operation.

Demonstration of Data Augmentation Methodology

1. Data Collection and Pre-Processing

The methodology starts with real data collection using a real threat or simulant or otherwise innocuous material. In order to implement a demonstration of this feature of the methodology, an Augmentation Graphical User Interface (GUI) was designed and the functionality coded.

The Augmentation GUI requires input data, a temporary folder for extracted image data, and an output folder. After selecting the folders, in this particular instantiation, the data must be uncompressed, and the image data extracted from specially formatted files. The GUI will analyze each baggage scan file one at a time, and the entire augmentation process will be completed for each scan file.

Figure 3:
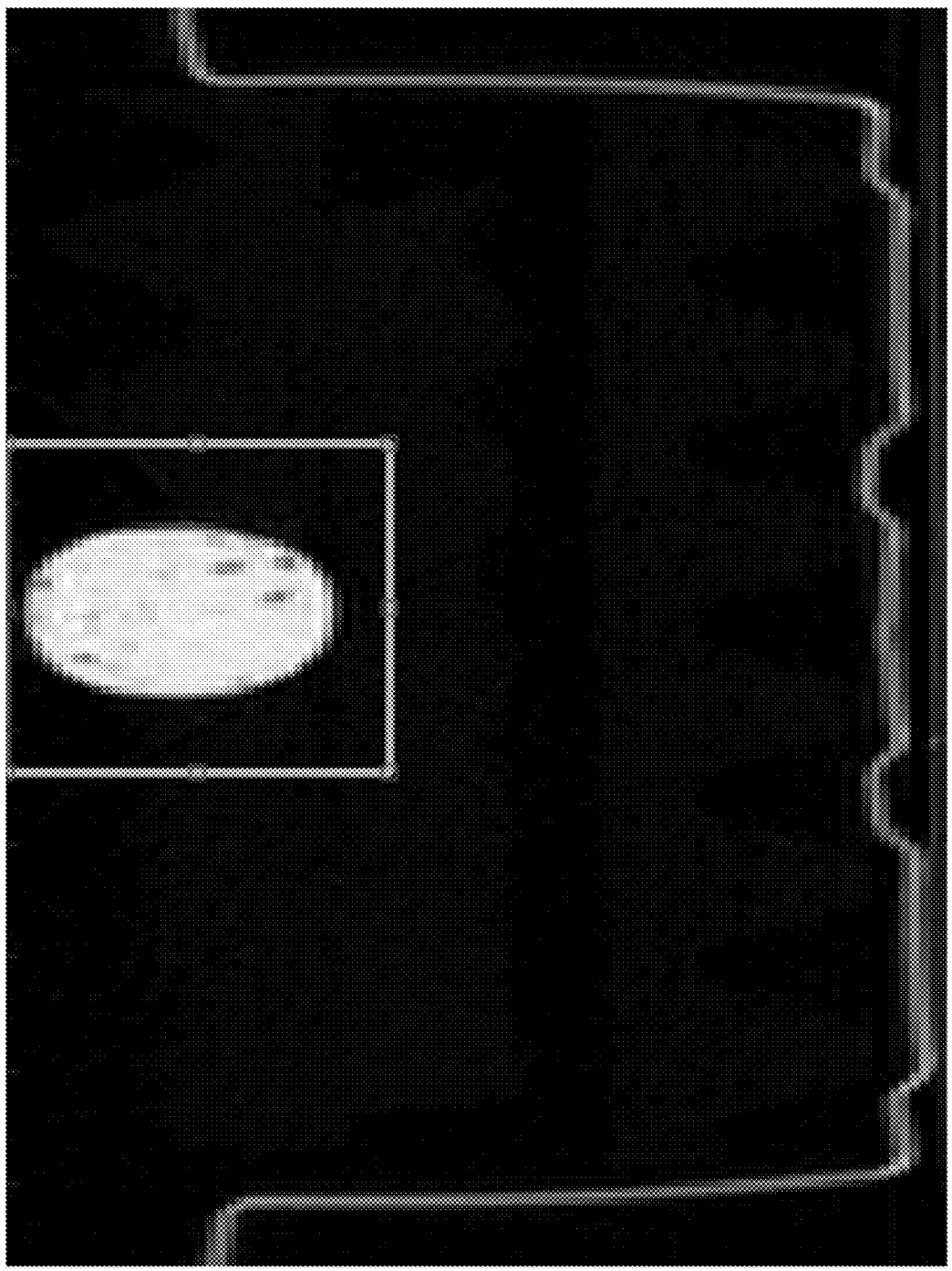
FIG. 3 shows an example of X-Y cropping the images.
Figure 4:
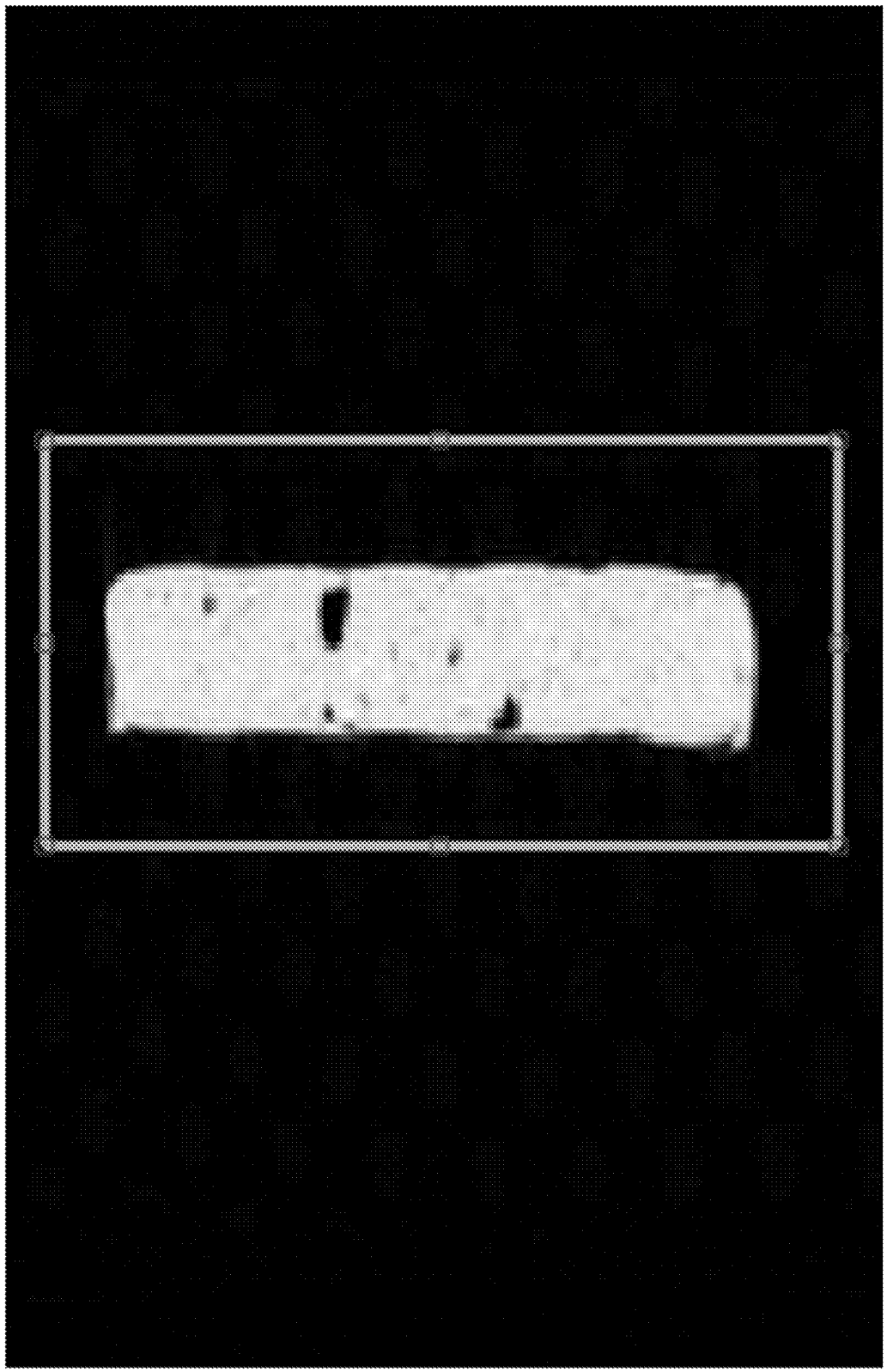
FIG. 4 shows an example of Z cropping the images using display of the X-Z slices.

In this instantiation, a single bag image file contains a three-dimensional volume of reconstructed x-ray tomography data. In order to demonstrate the methodology, twelve simulants were each scanned once, in a non-cluttered environment. To simplify data analysis and augmentation, the volume image file is manually cropped by the user. FIG. 3 shows X-Y cropping of the image data contained in the volume image file. In FIG. 3, the cropped region in the X-Y plane is shown in the figure window of the GUI. In similar fashion, the 3D volume is cropped in the Z (axial) dimension. FIG. 4 shows Z cropping of the image data contained in the volume image file (using display of X-Z slices).

The GUI then proceeds to automatic segmentation. Because the data used for this demonstration consisted of a single object contained within low-density foam, and because the manual cropping removes the outer container (such as a bin or Pelican™ case), segmentation of the object is easy to accomplish. The segmentation is accomplished with connected component labeling, and is followed by an erosion to eliminate voxels associated with the shell of the object or partial volume effects.

Figure 5:
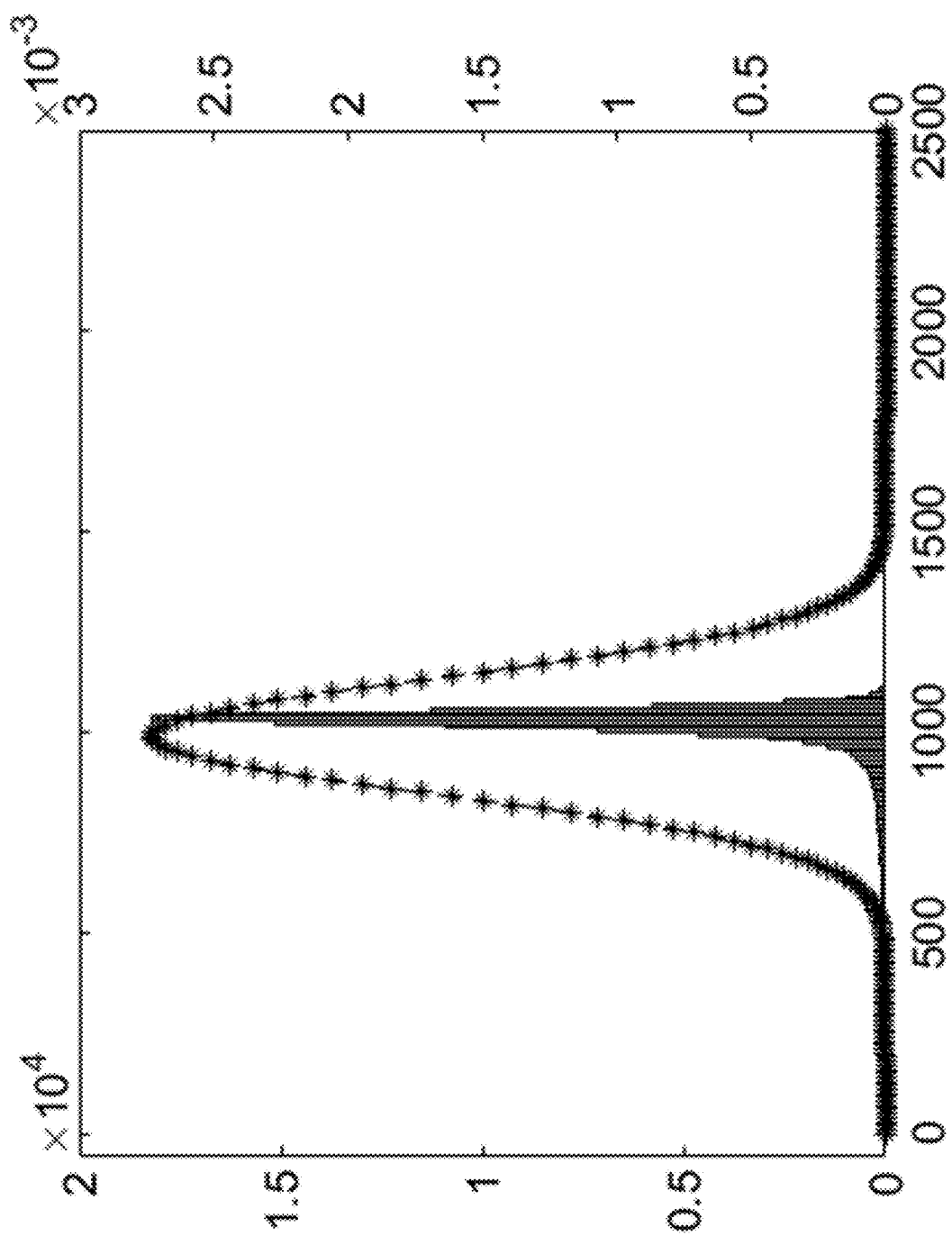
FIG. 5 shows an example of a histogram of the object CT number data and the resulting Gaussian fit.

Once the object is labeled in the data, the features are extracted from the data. In this demonstration, the data were collected with a single-energy CT (computerized tomography) scanner and, as such, there is only one set of CT numbers associated with the object. If this were a dual-energy scanner, there would be at least two sets of data. All of the CT number (CTN) values for the whole object are fit to a Gaussian probability distribution, and a histogram of the data is plotted along with the Gaussian fit. FIG. 5 shows an example of a histogram of object CT number data and Gaussian fit (using star symbols). In this case, which was typical for the data collected for this demonstration, the CT number data are skewed toward lower values, due to air gaps, density inconsistencies, and partial volume effects, and the Gaussian fit is not particularly good. Nevertheless, the mean and standard deviation are recorded.

Figures 6, 7:
FIG. 6 shows Table 1 containing the results of the Gaussian fit to the object data with and without a fit threshold.
FIG. 7 shows the display of the results of the Gaussian fit to the object data of Table 1 without a fit threshold.
Figure 8:
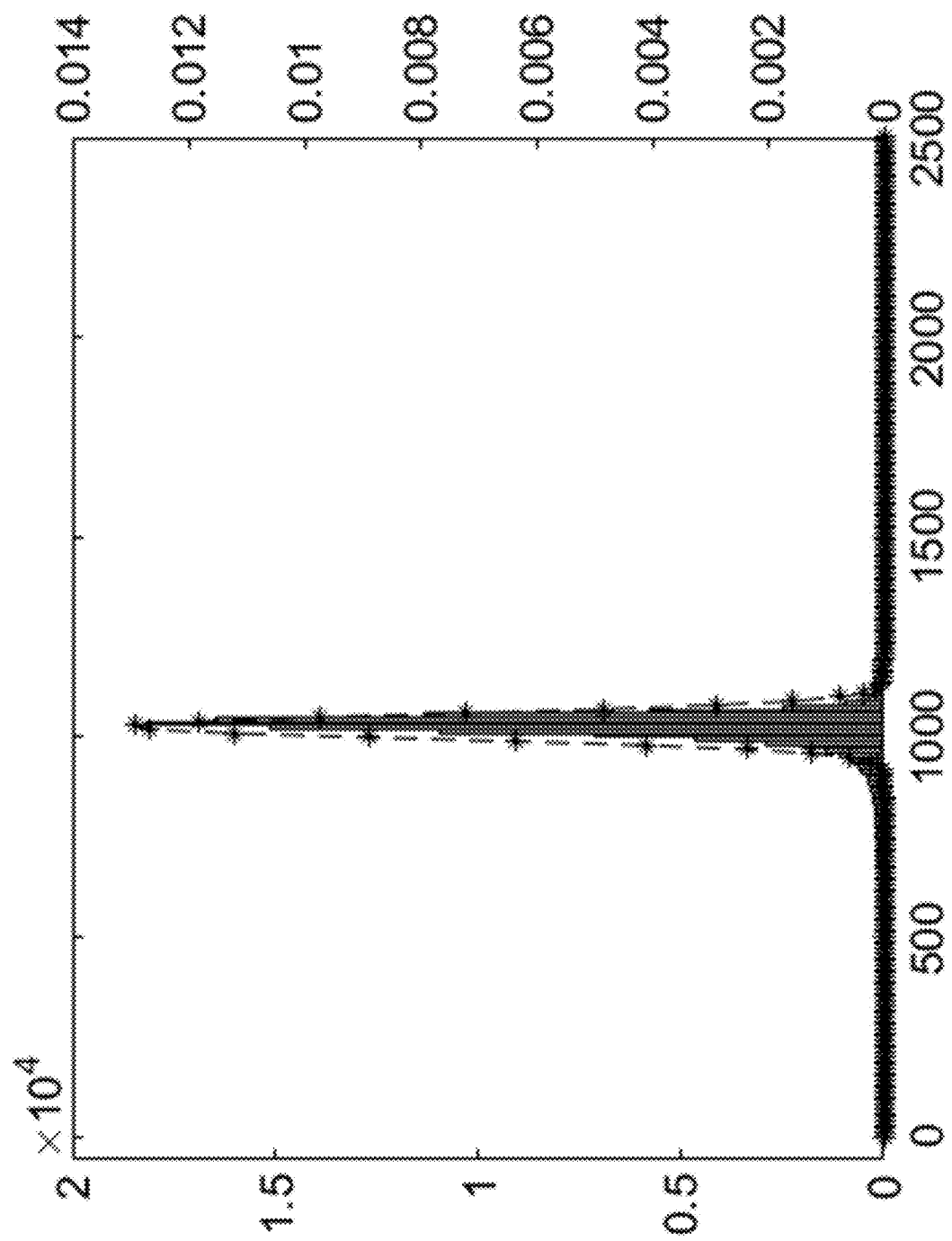
FIG. 8 shows an example of a histogram of the object CT number data, and the resulting Gaussian fit, using a fit threshold.

If desired, a threshold can be applied to the Gaussian fit so as to eliminate the above effects and fit only the main peak in the data. The GUI can repeat this process as many times as desired; each time the mean and standard deviation of the resulting Gaussian peak fit are displayed within the GUI. Table 1 (FIG. 6) shows Gaussian fit results with and without thresholding. FIG. 7 shows a display of the Gaussian peak fit tabulated results of Table 1, without using a threshold. Using a threshold which is just at the lower side of the peak, the Gaussian fit to the (peak) data is quite good, as seen in FIG. 8, which shows an example of a histogram of object CT number data using a fit threshold (975), and the resulting Gaussian fit (using star symbols).

2. Examples of Implementing Data Augmentation

Once the CTN data have been read and parameterized using a Gaussian fit, the data augmentation can proceed. For example, there are ten different approaches to the augmentation which have been implemented in the Augmentation GUI, as follows:

1) Shift of CTN values of all pixels by a percentage of the mean value determined by the Gaussian fit,
2) Shift of CTN values of all pixels by a fixed value,
3) Smoothing of the CTN values,
4) Addition of noise to the CTN value,
5) Replacement of CTN values using a Gaussian probability distribution, random number generator, and the parameters from the Gaussian fit to the CTN data,
6) Contrast adjustment,
7) Resizing (to a larger size object),
8) Distortion of the image,
9) Insertion of texture, and
10) Addition of a CTN gradient.

Figure 9:
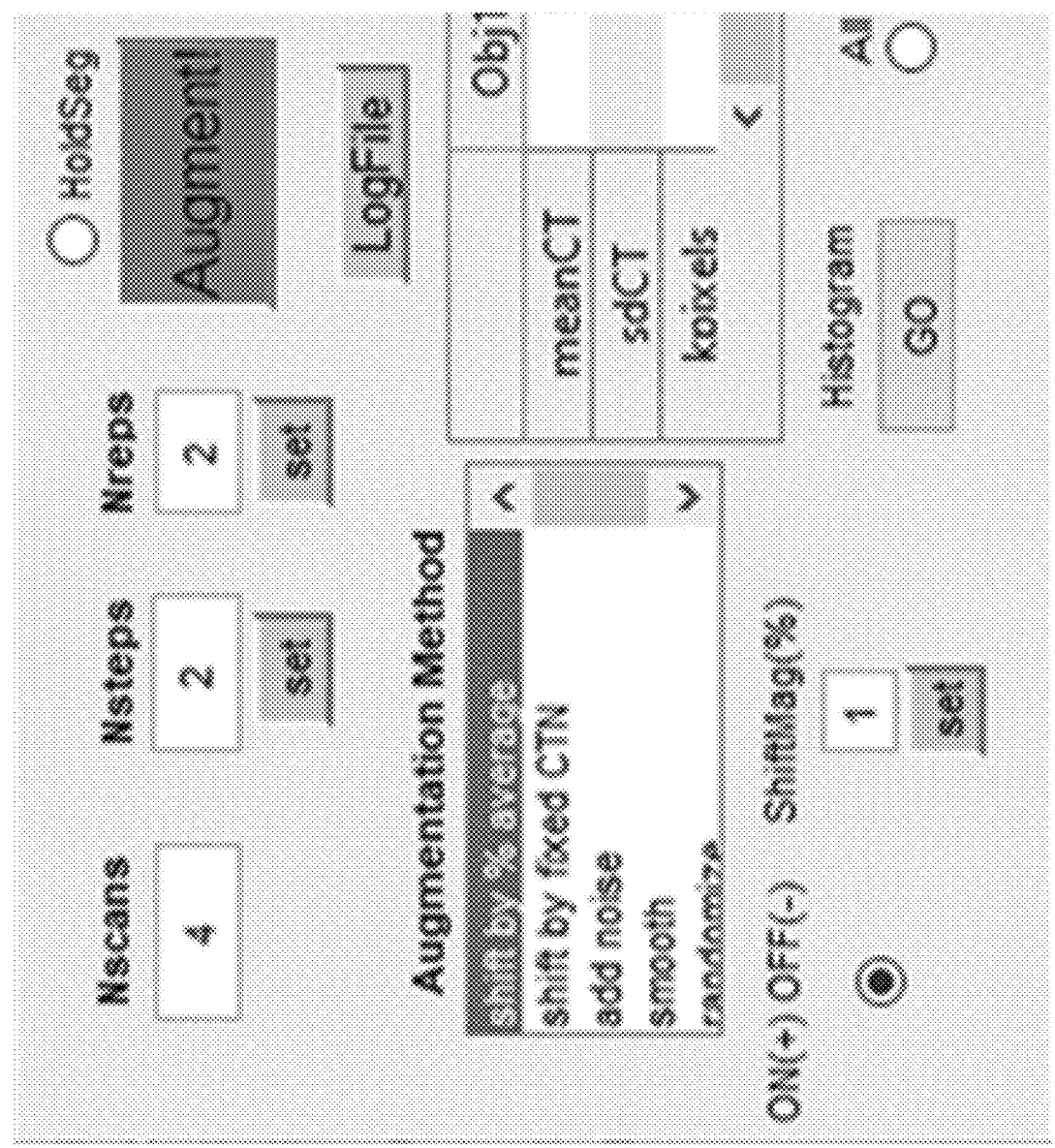
FIG. 9 shows an example of a display of the section of the Graphic User Interface (GUI) where the augmentation options are chosen.

Each of these options is discussed in more detail below. FIG. 9 shows an example of a display of the section of the GUI where the augmentation options are chosen. The section highlights the augmentation method option selection but not all options are visible in this example. The displayed parameters will change depending on the selected method. The user can select the method and specify the parameters.

Option 1—Percentage Shift

In this option, the user sets the magnitude of the shift and the direction of the shift (positive or negative). The user specifies a number of steps and a number of repetitions.

The steps correspond to increasing multiples or degrees of the augmentation. The first step will shift by the specified shift magnitude percentage, the second by two times the specified shift, and so on. The total number of output files per input file will be the number of steps times the number of repetitions.

The repetitions are repeated operations using the same parameters, except with a small random noise component added to each pixel value. In this way, one can generate nearly identical images and calculate a probability of detection based on, for instance, 10 images. It may be preferable to either limit study to only one repetition, or to ensure the degree of noise would be commensurate with what would be experienced with the real scanner.

Option 2—Absolute Shift

The operation of Option 2 is nearly identical to Option 1. The user sets the magnitude of the shift of the CT number (for example, a shift of 25 on a scale where water would average around 1000). The effect of the shift relative to the detection algorithm will depend on the system and the scale it uses for the data (such as 8-bit unsigned integer, 16-bit, 32-bit, etc.). In this option, the user sets the number of repetitions and steps as well.

Option 3—Adding Noise

In the current instantiation, a Gaussian noise component can be added to the image, where the user sets a parameter that determines the size of the effect. The result will be to increase the standard deviation of the data without changing the mean. In this option there is only one repetition, but the user sets the number of steps as in previous options, with increasing amounts of noise with each step.

Option 4—Smoothing

In this option the data will be smoothed (blurred) using a 3-dimensional median filter. There are no additional steps or repetitions in this option, and it is a one-for-one operation resulting in one output file per input file.

Option 5—Randomization

This option takes the mean and standard deviation values derived from the data and creates new CT number values for every pixel in the object using a Gaussian random number generator. This is where the threshold becomes important when fitting the data. If a zero threshold is used, then the Gaussian probability distribution could be quite different from the observed data, depending on the shape of the original distribution. This was observed in the initial studies, where the data were skewed towards lower CT number values. As a way of adjusting the outcome and creating a plurality of possibilities, using a threshold in the fitting process may affect the resulting probability distribution and the data from the random number generator. Furthermore, in order to preserve some of the texture arising from air pockets or density variations, an additional threshold can be used where any pixel with CT number below the threshold will not be replaced. In this option the user sets the number of repetitions, but there is only one step.

Option 6—Contrast Enhancement

It is well known that contrast within an image can be modified with various techniques. Although, in this case, there is no particular purpose for improving image contrast, the effect on the image is to modify the CT numbers, by changing the distribution of pixel values. There are different methods that could be implemented, including contrast limited adaptive histogram equalization (CLAHE), but typical contrast enhancement represents a rather severe, and potentially unrealistic, change to the image data. As a much milder approach, a small shift in the contrast was implemented.

Option 7—Object Resizing

It is common practice to study detection algorithm performance as a function of threat mass. For a given type of threat material, the overall mass would be changed. This option can also change the size of the object of interest, using a resizing function, and then replacing the associated pixel values in the original data. The implementation of this option is different from most of the others, because the size of the augmented volume changes. As a result, there are limitations, in the sense that the object can only be increased in size so much before problems will arise. It is possible to reduce the size of the original object as well but this may require a content-aware filling of the pixels that would be replaced by void space (i.e., low-density foam or air).

Option 8—Object Distortion

Embodiments of the invention provide the possibility of introducing some form of distortion of the object data. This can take on a plethora of possibilities, but for demonstration purposes, a method of distorting the object while retaining the original outline shape of the object was implemented. The implementation utilizes an image warping function, and specifically introduces a pincushion distortion. This results in circular artifacts in the image. As with Option 7, any change to the shape of the original object makes the programming of the GUI more complicated. Different types of distortions are certainly feasible.

Option 9—Texture

There are many possibilities for this option, but for the sake of demonstration, a relatively simple method was chosen, in which inclusions are introduced which have different CT numbers from the original data. This is similar to the introduction of noise (Option 3), and is also similar to randomization (Option 5), except that each inclusion can be made to be any size, if desired, with CT numbers as defined in the computer code. In this particular instantiation, the size of the inclusion was either one pixel or four pixels, for the sake of simplicity. The replacement CT number can be any random value between two limits, with uniform probability, and for larger inclusions an alternative approach could be used to simulate the partial volume effect. The user can select the number of steps, and with each step the probability of an inclusion increases. The new CT number for a given pixel is based on its original value, shifted by a random amount, within limits established in the code. In the first instantiation, the range for the shift was limited to between a 10% decrease and a 25% increase in value. For example, if the selected pixel has a value of 1000, then the new value will be between 900 and 1250, with uniform probability between those limits.

Option 10—Gradient

The tenth option is the addition of a longitudinal gradient, along the Z-axis of the object. As currently implemented, the gradient can be either in a decreasing or increasing trend, where the user specifies the maximum shift of CTN values. The shift is applied to each slice equally, in proportion to where the slice is along the object length, where the first slice is not shifted, and the last slice is shifted by the maximum relative amount specified by the user. Although other possibilities exist, the gradient as implemented was linear. Each step in the augmentation process, if more than one step is requested, will increase the shift in multiples, so the $2^{nd}$ step would have twice as much gradient as the $1^{st}$ step, the $3^{rd}$ step three times as much, and so on.

3. Results from the Augmentation GUI

When the project implementing data augmentation started, a small set of twelve different parametric simulants were scanned one time each in a commercially produced baggage scanner. This is a monoenergetic scanner with an area detector and represents the current state-of-the-art in baggage scanning image quality. A single simulant object was placed in low-density foam, within a plastic bin, and inserted into the scanner. These scans resulted in twelve folders which have numbers 445 through 456 associated with them. In the results that follow, some of these "bag" numbers are referenced. The only distinction is that each of the twelve objects had different composition, density and/or effective atomic number. In post-analysis, four of the twelve were somewhat redundant in terms of their average CT number, and were mostly ignored. (In a dual-energy scanner they would likely have been distinct from the other simulants.)

In order to conveniently analyze augmented data, the Augmentation GUI has the ability to skip the augmentation process (although augmented data can be further augmented if desired). The results of the augmentation options are described next, in terms of the properties of the modified CT data.

Options 1 and 2—Shift of CT Number

For Option 1 with a shift of the CT numbers by a fixed percentage, a set of bag scans (#450, 452, 454, and 456) were augmented using a shift parameter of 25%, with two steps. Table 2 (FIG. 10) shows results from percentage shift (Option 1). Table 2 contains an example of the results of augmentation shifting the CTN data by a percentage. The columns labeled "meanshift" show the shift of the mean value of the CT number data, using no threshold or using a specific threshold. Rows that contain "n/a" contain the original data. Whether or not a threshold was used to fit the data to a Gaussian distribution, the mean of the distribution was always shifted by 25% and 50% for steps 1 and 2, respectively. (This threshold is referred to as a fit threshold.)

For Option 2 with a shift of the CT numbers by a fixed value, a set of bag scans (#445, 446, 448, and 449) were augmented using a shift of −100 with 3 steps, and a shift of +10 with 2 steps. Table 3 (FIG. 11) shows results from absolute shift (Option 2). Table 3 contains an example of the results of augmentation shifting the CTN data by an absolute amount. The "meanshift" columns show the absolute shift of the mean value of the CTN data, without using a fit threshold for the computation. The mean values of the CTN all shifted by approximately the amounts specified in the GUI.

Option 3—Addition of Noise

Figure 12:
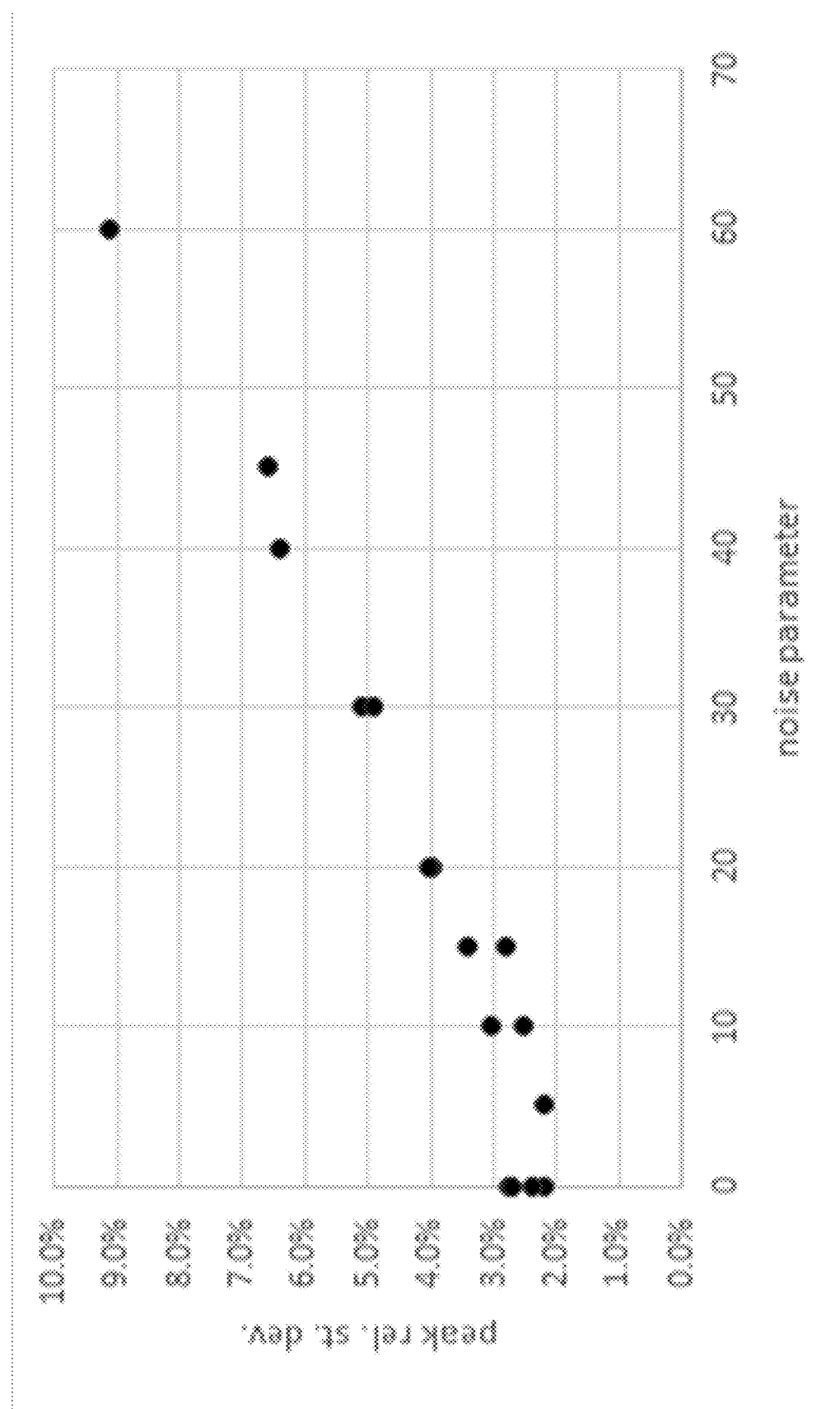
FIG. 12 shows an example of the effect of the addition of noise to the images.

For Option 3 with the addition of noise, the set of bags (#445, 446, 448, 449) were analyzed and augmented using a noise parameter ranging from 5 to 60, using 3 steps, which were different for each bag. For bag 445 the increment of the noise parameter with each step was 5, with bag 446 it was 10, and so on. The change in the relative standard deviation (RSD) of the data both with and without a fit threshold was studied. The effect was minimal when not using a threshold. The RSD of the peak (using a threshold) ranged from 2-3% prior to augmentation, and the RSD after augmentation ranged up to 9% in a linear fashion with increasing noise parameter. FIG. 12 shows an example of the effect of the addition of Gaussian noise with noise parameter to the images.

Option 4—Data Smoothing

For Option 4 which performs smoothing of data, the set of bags (#445, 446, 448, and 449) were analyzed, with and without a fit threshold, and then the data were smoothed and analyzed in like manner. The effects on the data were minimal but evident, as seen in Table 4 (FIG. 13), which shows examples of the effects of data smoothing (of the CTN data). The effect is more noticeable on the peak of the distribution, i.e., using thresholds in the fitting of the data. The relative standard deviation (RSD) in the original data ranged from 2.2 to 2.8%, while in the smoothed data the RSD decreased to 1.3 to 2.2%. The peaks in the distributions of CT number data clearly became narrower, and the images were visually blurred.

Option 5—Randomization of Data

Option 5 represents an opportunity for a considerable plurality of augmented data sets. The intention is to be able to take an original data set and characterize the data using a Gaussian fit, as discussed earlier. The augmentation would then use the original object pixel labels and replace the pixel value with a randomly generated value based on the results of the Gaussian fit. Since the Gaussian fit is affected by the use of a threshold which eliminates certain pixels from the Gaussian fit, the mean and standard deviation of the fitted distribution can take on a variety of values. Furthermore, an additional threshold can be used which would preserve the original CT number values of pixels excluded by the threshold, so as to preserve certain features of the original images. (Not only can a low-value threshold be used to preserve values lower than the threshold, but also a high-value threshold can be used to preserve values greater than the threshold.)

FIGS. 14-19 show examples of the effects of using different combinations of fit threshold in the Gaussian fitting process and application threshold in the randomization process (Option 5).

Figure 14:
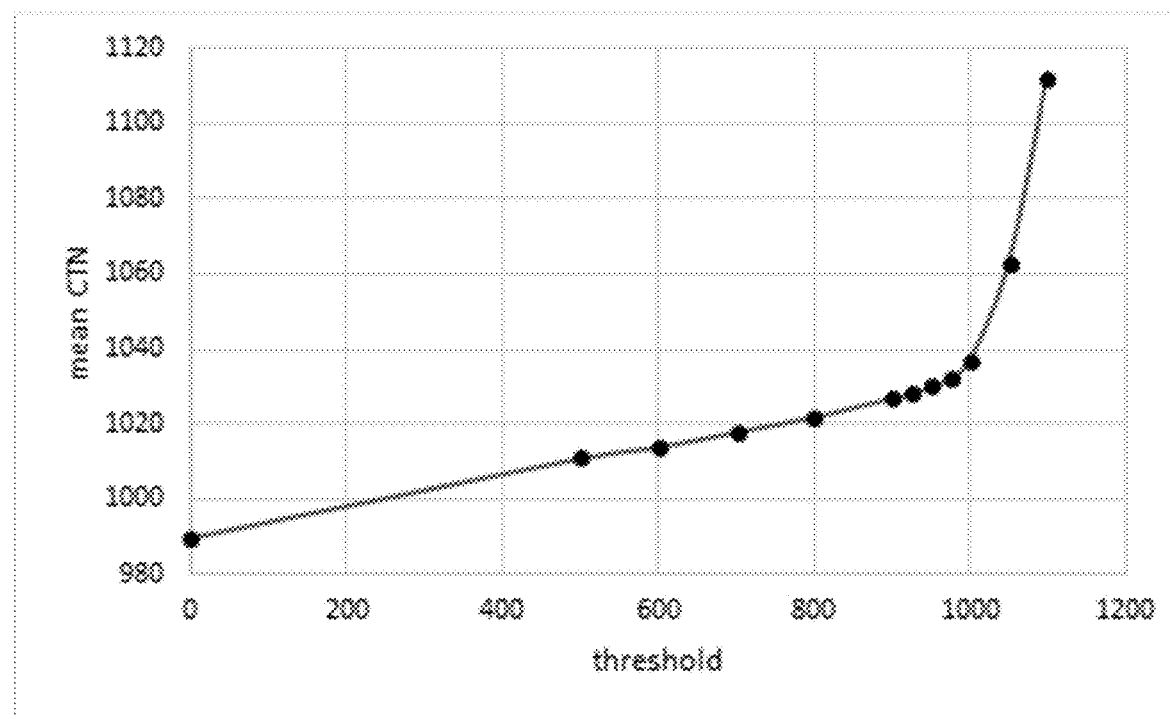
FIG. 14 shows examples of effects of utilizing a threshold in the Gaussian fitting process, including (A) the effect on the mean as a function of the threshold and (B) the effect on the mean and standard deviation.
Figure 14:
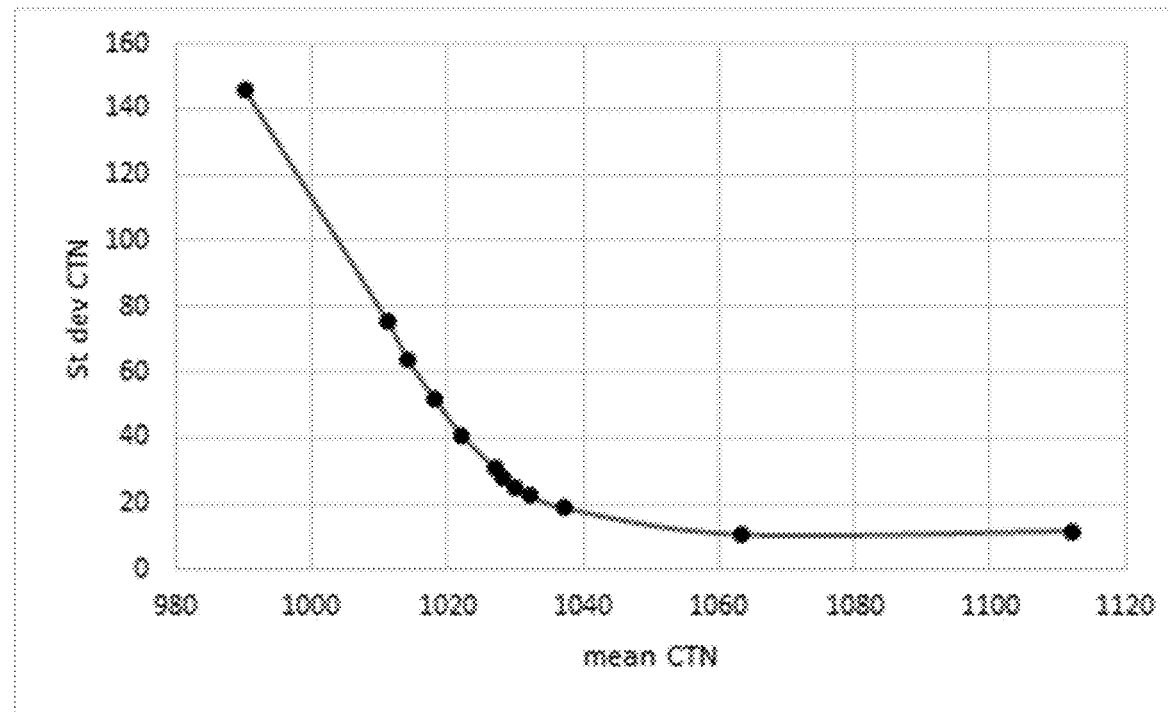
Figure 15A:
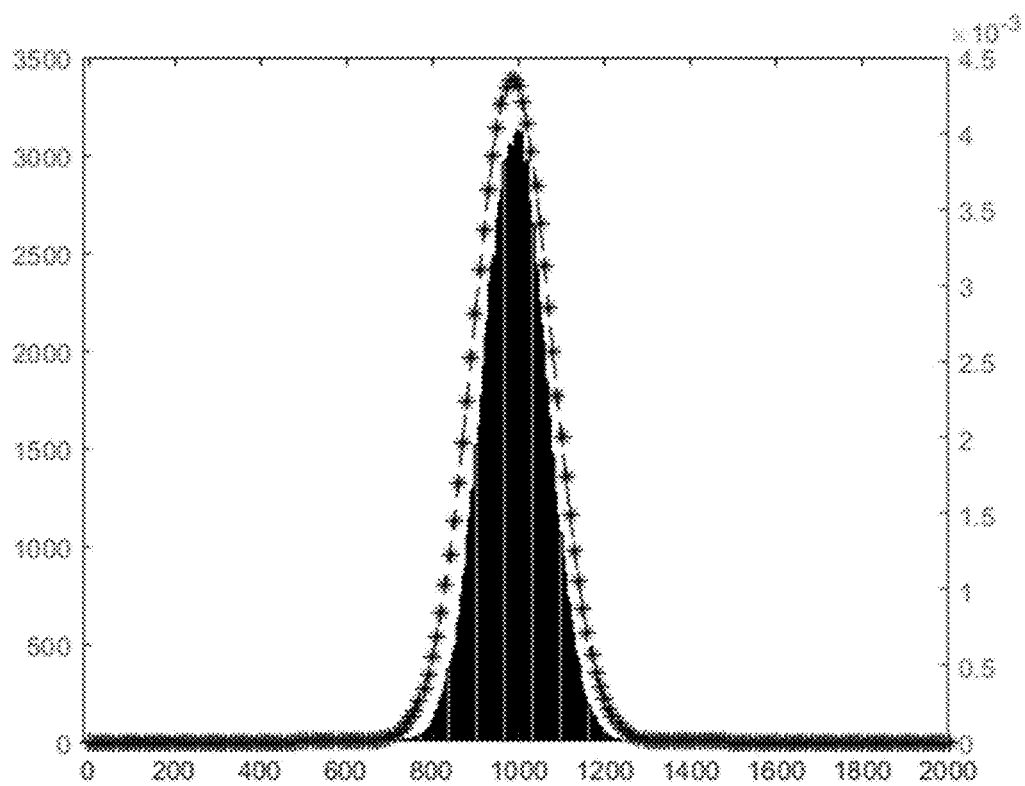
FIGS. 15A-15E show examples of effects of increasing the fit threshold (in the fit to original data), without using an application threshold, where the threshold is 0 in FIG. 15A, increasing to 600, 900, 975 in FIGS. 15B-15D, and 1050 in FIG. 15E.
Figure 15B:
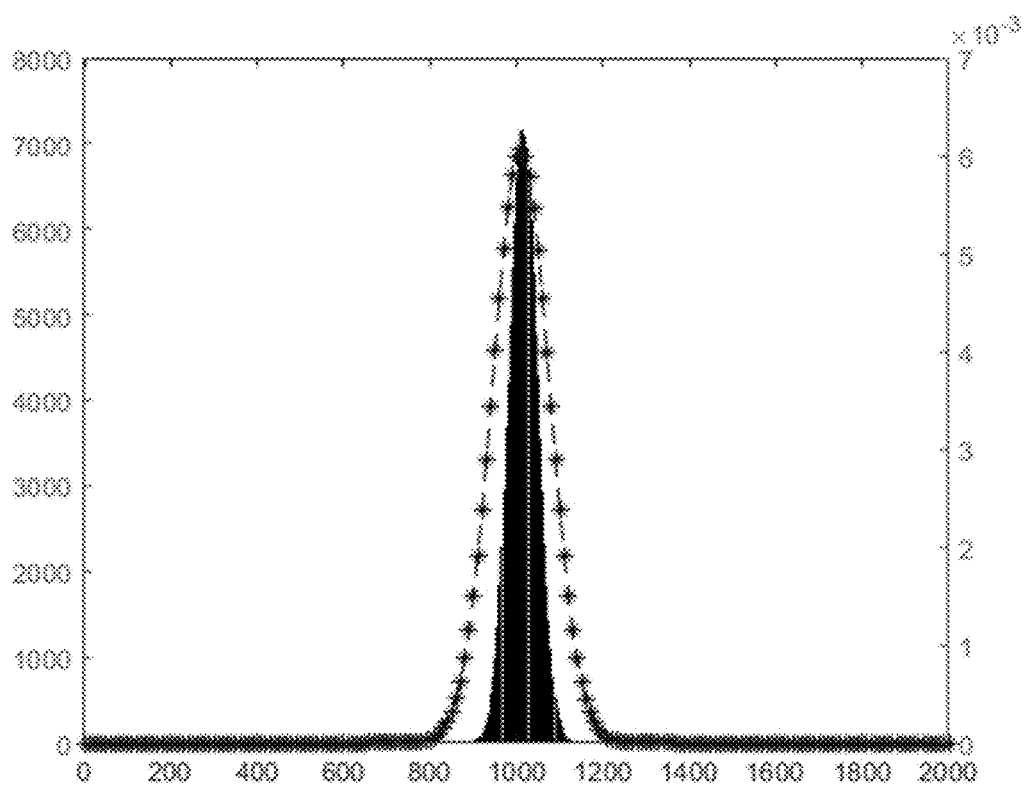
Figure 15C:
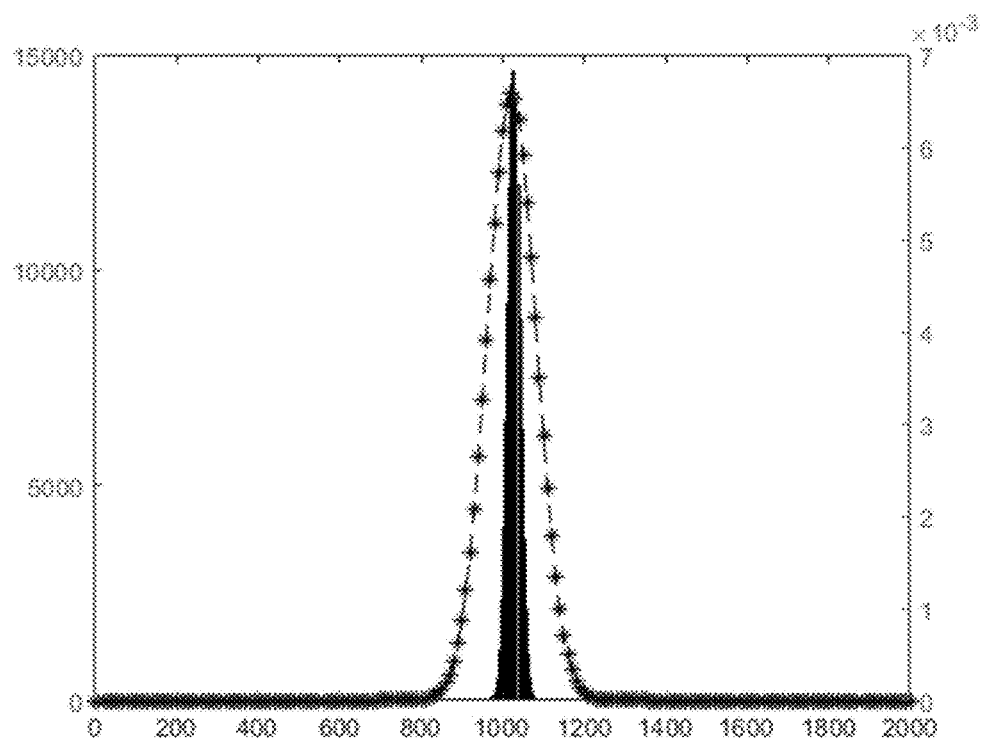
Figure 15D:
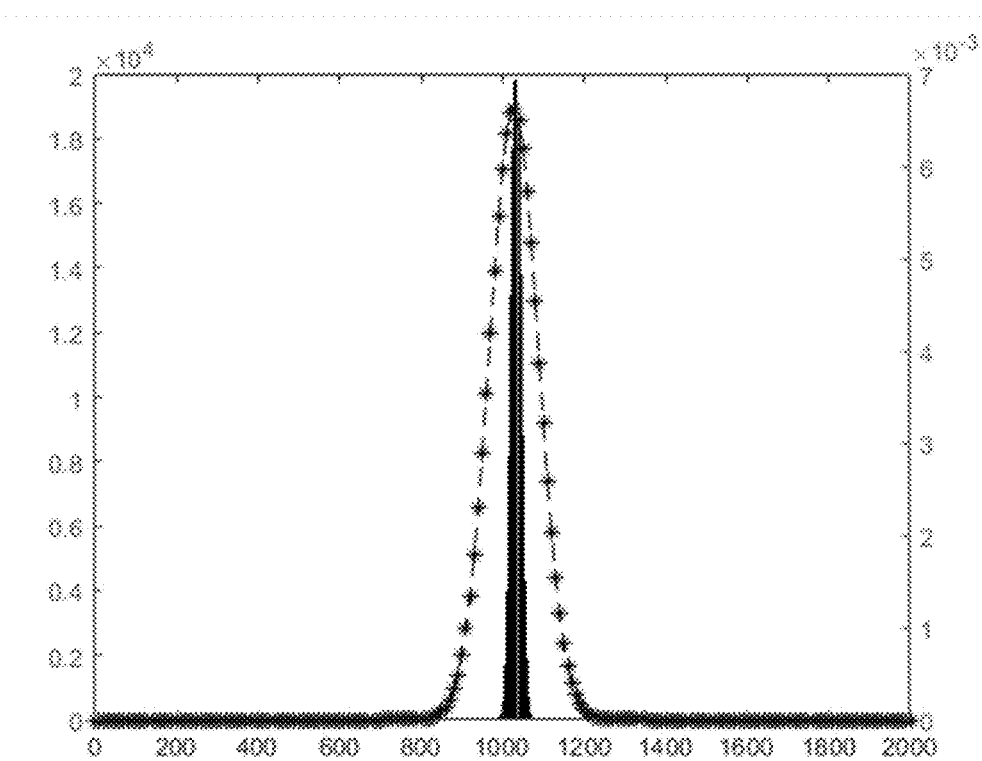
Figure 15E:
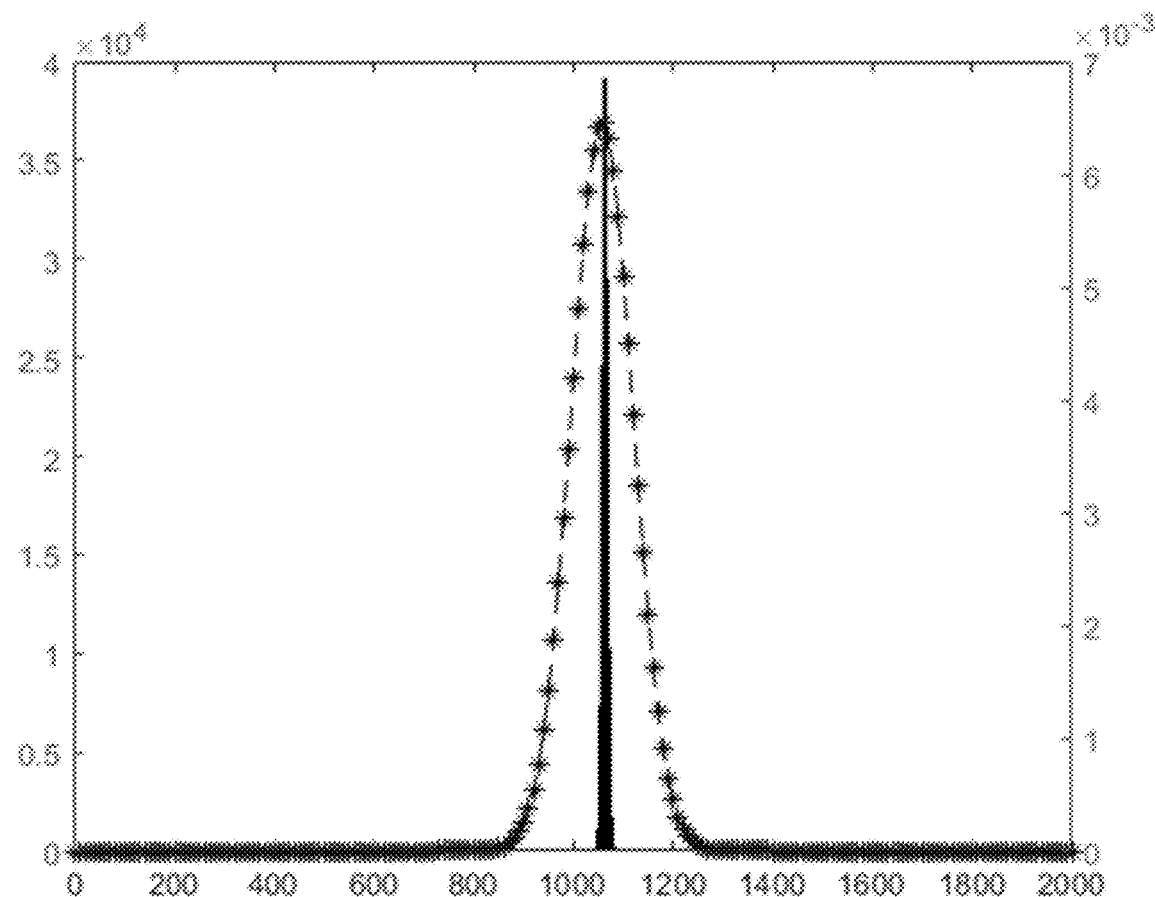
Figure 16A:
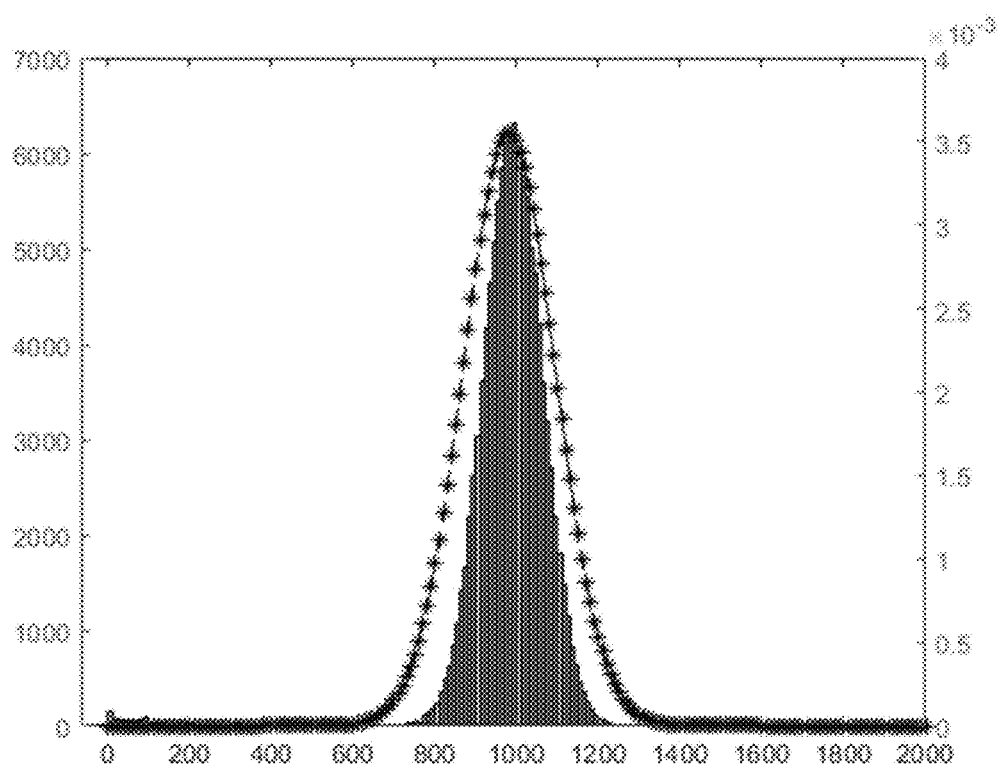
FIGS. 16A-16E show examples of effects of increasing the application threshold, without using a fit threshold, wherein the application threshold starts at 100 in FIG. 16A, increasing to 250, 500, 900 in FIGS. 16B-16D, and 975 in FIG. 16E.
Figure 16B:
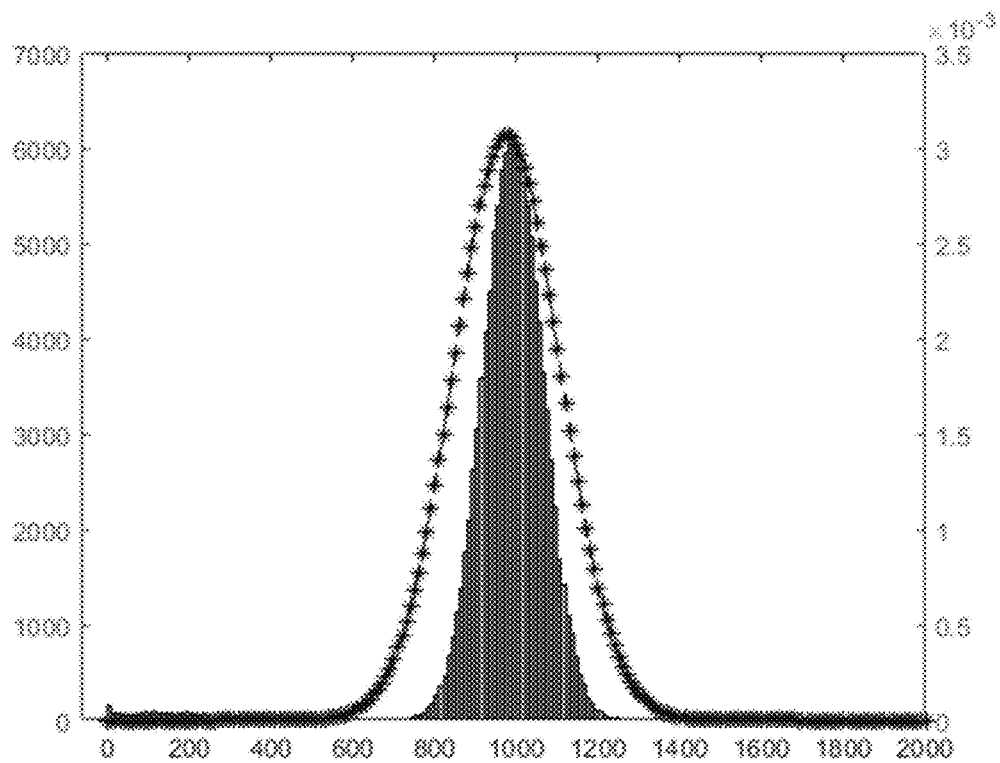
Figure 16C:
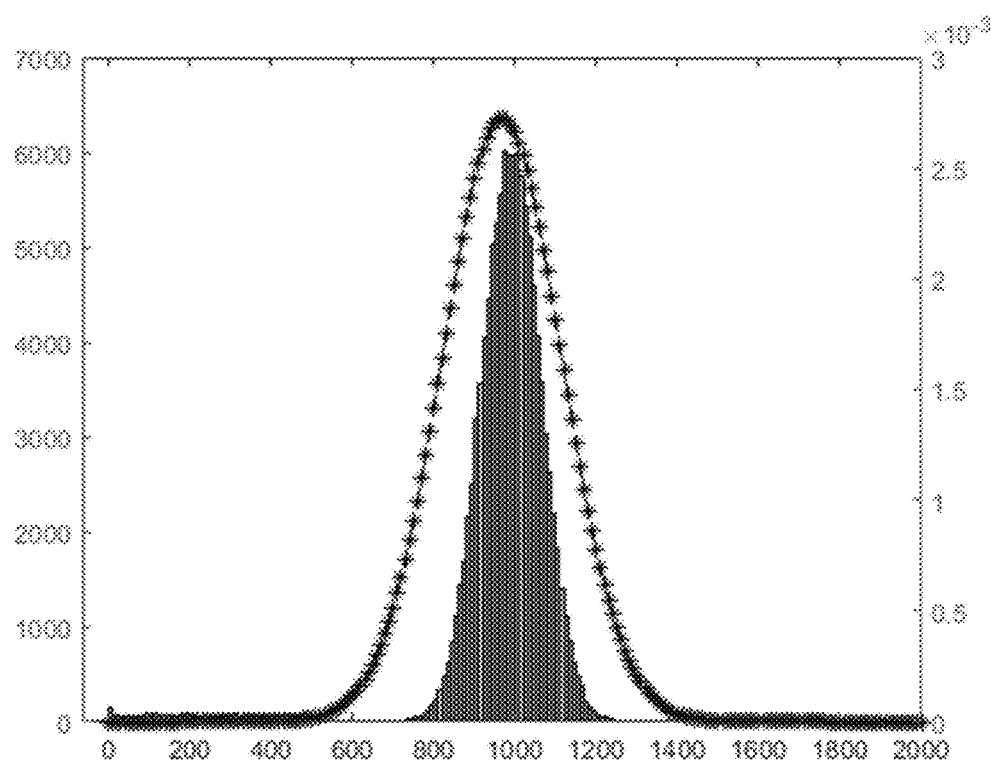
Figure 16D:
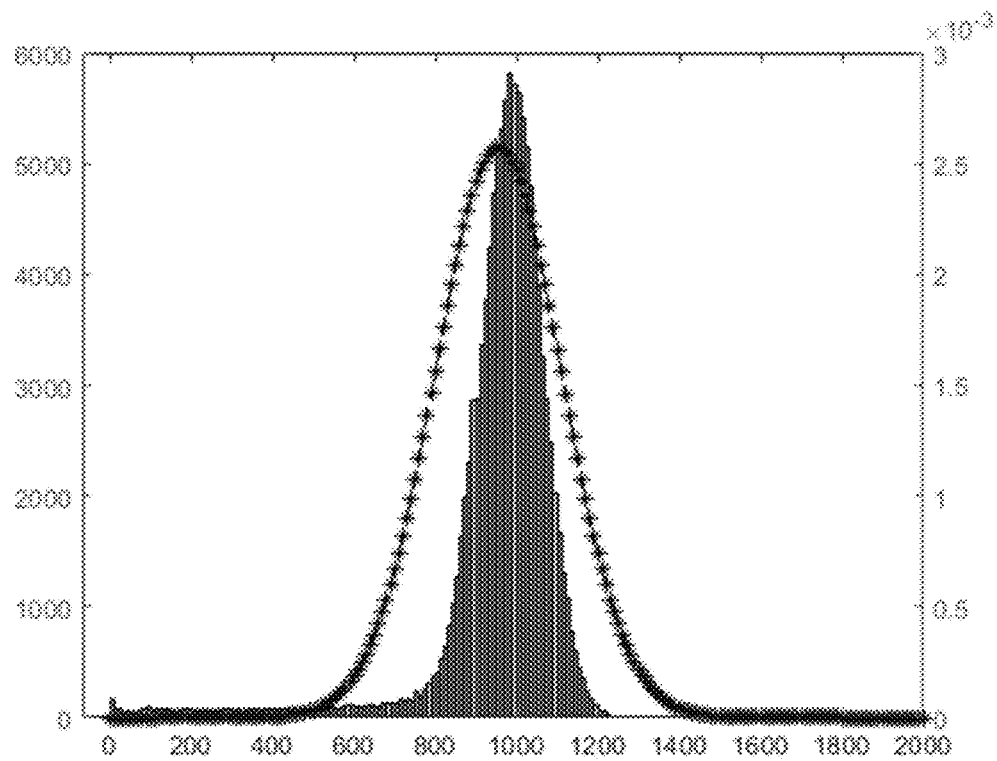
Figure 16E:
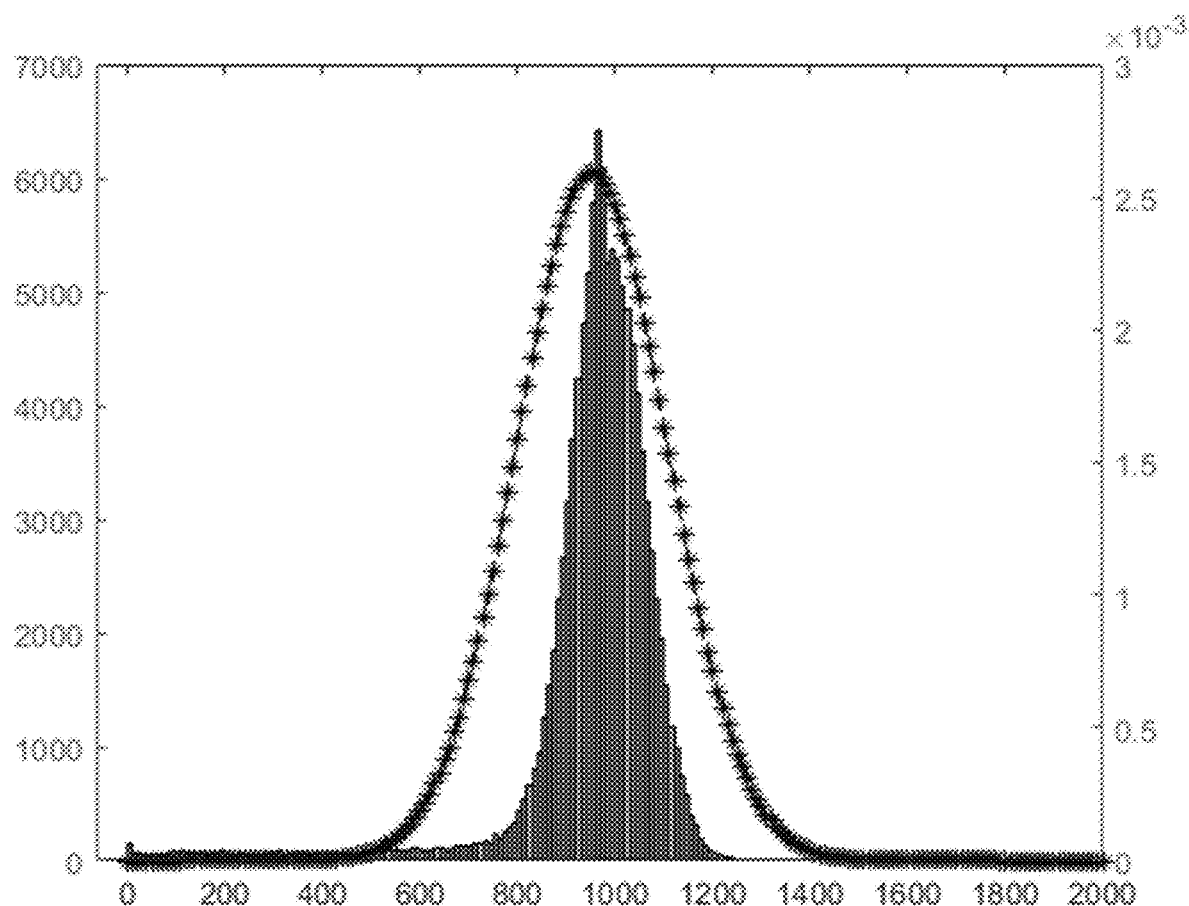

The anticipated behavior is as follows. As the fit threshold increases from zero, the fit will include less and less of the lower values that skew the primary peak in the distribution. The resulting fit of a Gaussian distribution to the remaining data will result in higher and higher mean values and lower standard deviation. This behavior is seen in FIG. 14, which shows examples of effects of utilizing a threshold in the Gaussian fitting process, including (A) the effect on the mean as a function of the threshold and (B) the effect on the mean and standard deviation. The augmentation which follows then uses the mean and standard deviation resulting from the Gaussian fit. The value of each pixel in the object will have a new randomly generated CT number based on the Gaussian parameters, resulting in a plurality of potential results which are tied to the fit threshold. However, the plurality is extended further, by using an additional application threshold, which excludes pixels from having their CT number replaced. As the application threshold is increased, more and more of the original (lower) pixel values will be unchanged, and the resulting distribution will become more and more skewed, as it will contain more and more of the original data. In this option, the augmentation that should look most like the original image would have a high threshold in the fitting and a high application threshold. The augmentation that will look most different from the original will not use thresholds at all (i.e., both set to 0).

The analysis of the data does not change the data itself, of course. Using the fit threshold to analyze the data is a way of doing two things: (1) it enables a characterization of the primary peak in the data, and (2) it provides the opportunity to change the parameters of the subsequent augmentation using a Gaussian random number generator.

FIGS. 15A-15E show examples of effects of increasing the fit threshold (in the fit to original data), without using an application threshold. The histogram is from the augmented data, and the subsequent fit (using star symbols) does not use a fit threshold. It shows five graphs from FIG. 15A where the threshold is 0, increasing to 600, 900, 975 in FIGS. 15B-15D, and 1050 in FIG. 15E. In FIGS. 15A-15E, the augmented data histogram distributions when using a fit threshold in the original fit are shown, along with the subsequent Gaussian fit to the augmented data (not using a fit threshold). As expected, as the original fit threshold is increased from 0 (FIG. 15A) to 1050 (FIG. 15E), which will decrease the standard deviation parameter and increase the mean, the resulting augmented distribution becomes narrower. The standard deviation of the resulting fit also decreases.

FIGS. 16A-16E show examples of effects of increasing the application threshold, without using a fit threshold. The application threshold starts at 100 in FIG. 16A, increasing to 250, 500, 900 in FIGS. 16B-16D, and 975 in FIG. 16E. In FIGS. 16A-16E, the augmented data histogram distributions when using an application threshold are shown, where there was no fit threshold used in the original fit. Since no threshold was used in the original fit, the parameters in the Gaussian random number generator remain the same, but the resulting augmented data distributions change with the application threshold. As expected, as the application threshold is increased, there is a growing proportion of lower-CT number data skewing the distribution, increasing the standard deviation of the augmented data.

Figure 17A:
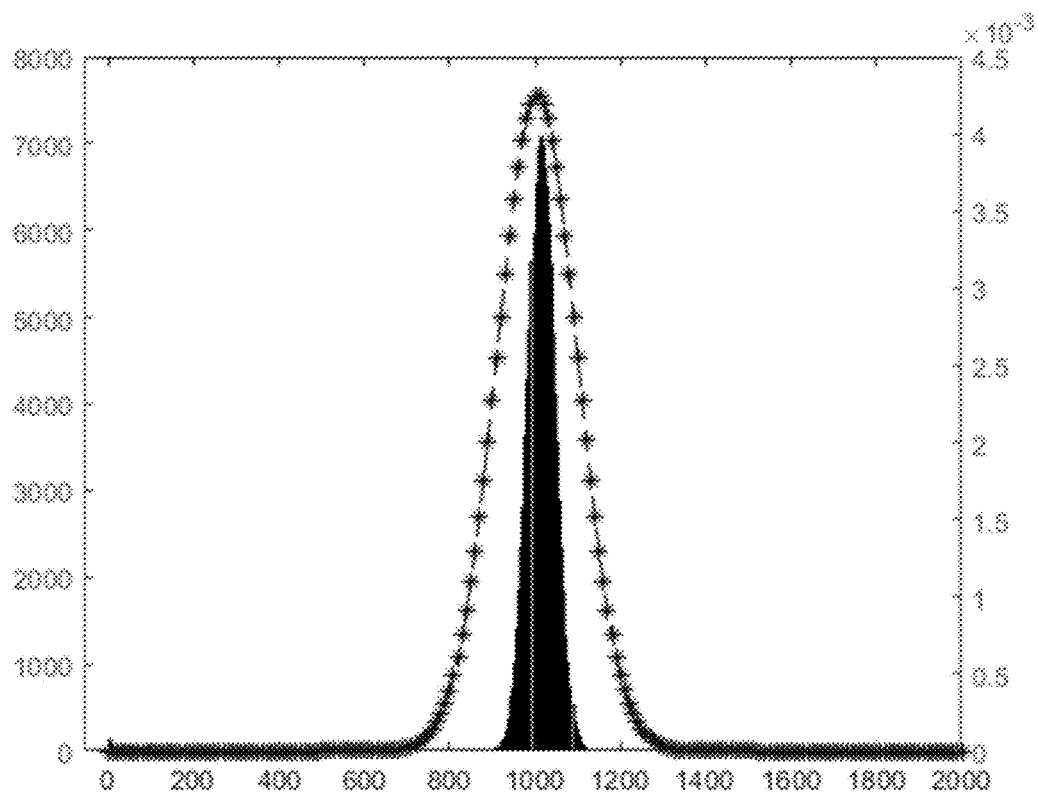
FIGS. 17A-17F shows examples of effects of increasing the application threshold from 100 in FIG. 17A to 500 in FIG. 17B to 975 in FIG. 17C, using a fit threshold of 600 and of increasing the application threshold from 100 in FIG. 17D to 500 in FIG. 17E to 975 in FIG. 17F, using a fit threshold of 975.
Figure 17B:
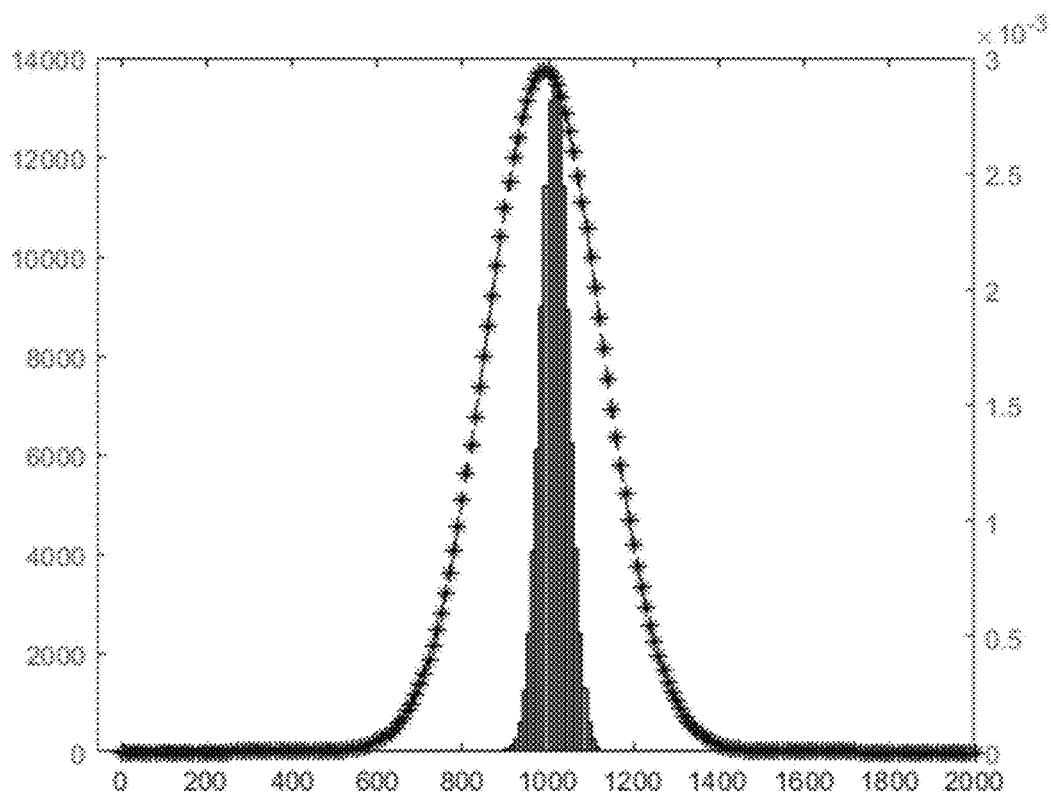
Figure 17C:
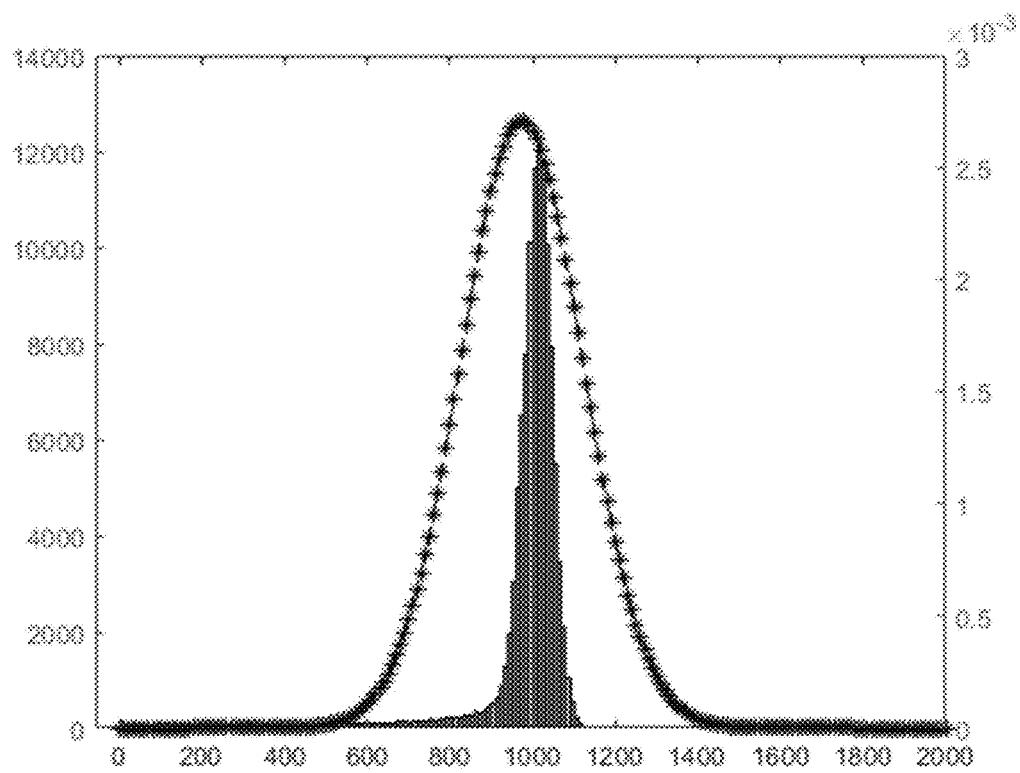
Figure 17D:
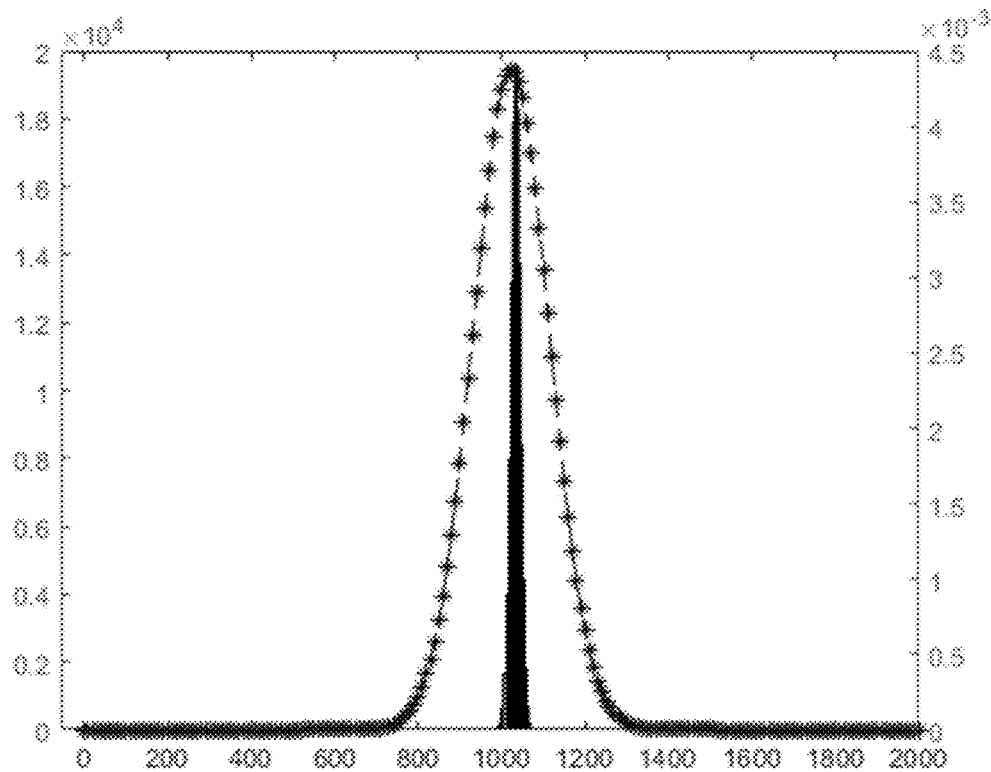
Figure 17E:
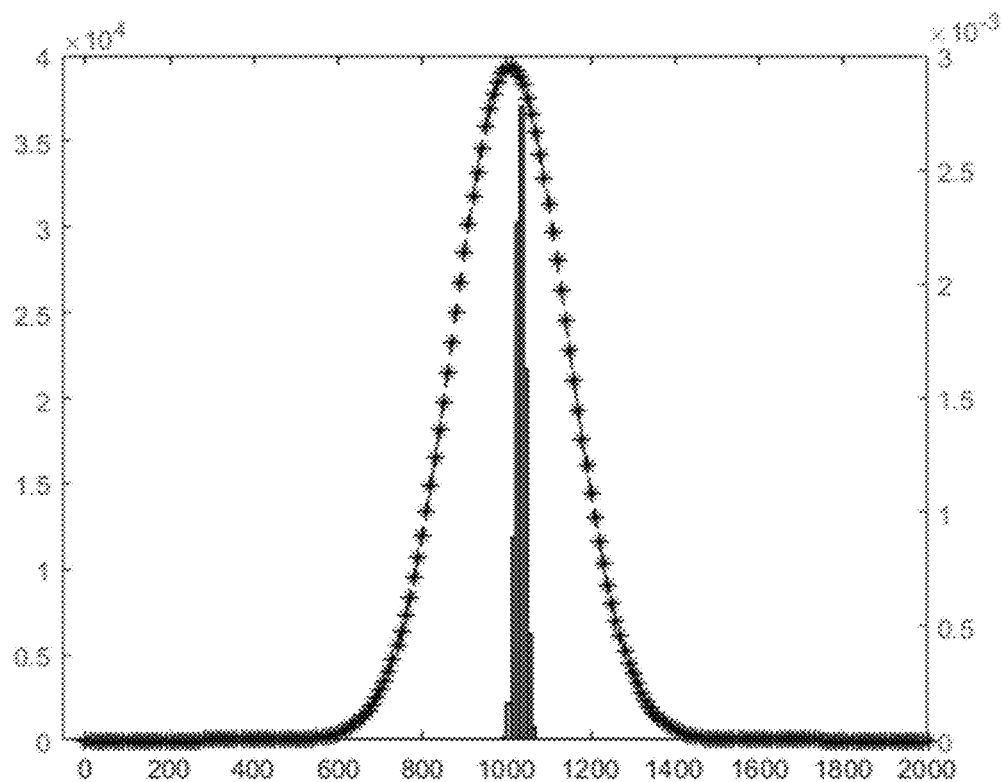
Figure 17F:
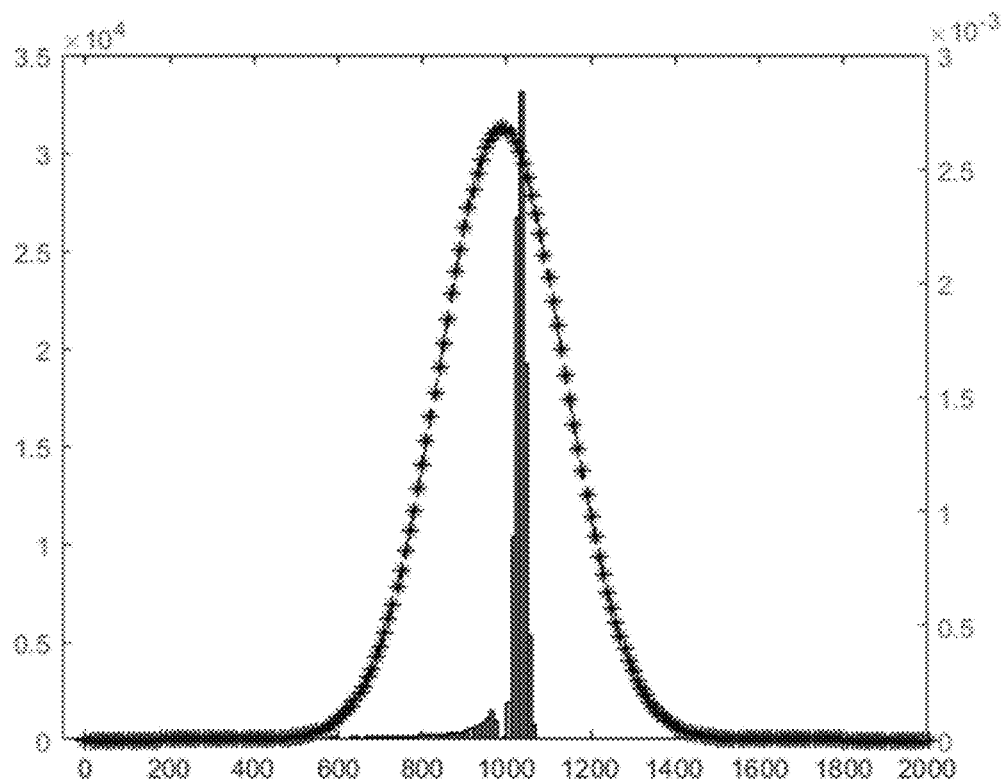

FIGS. 17A-17F show effects of increasing the application threshold from 100 in FIG. 17A to 500 in FIG. 17B to 975 in FIG. 17C, using a fit threshold of 600 and of increasing the application threshold from 100 in FIG. 17D to 500 in FIG. 17E to 975 in FIG. 17F, using a fit threshold of 975. It demonstrates the same effect, except where a fit threshold was used in the original fit. In each case, the effect of increasing application threshold is the same.

Figure 19:
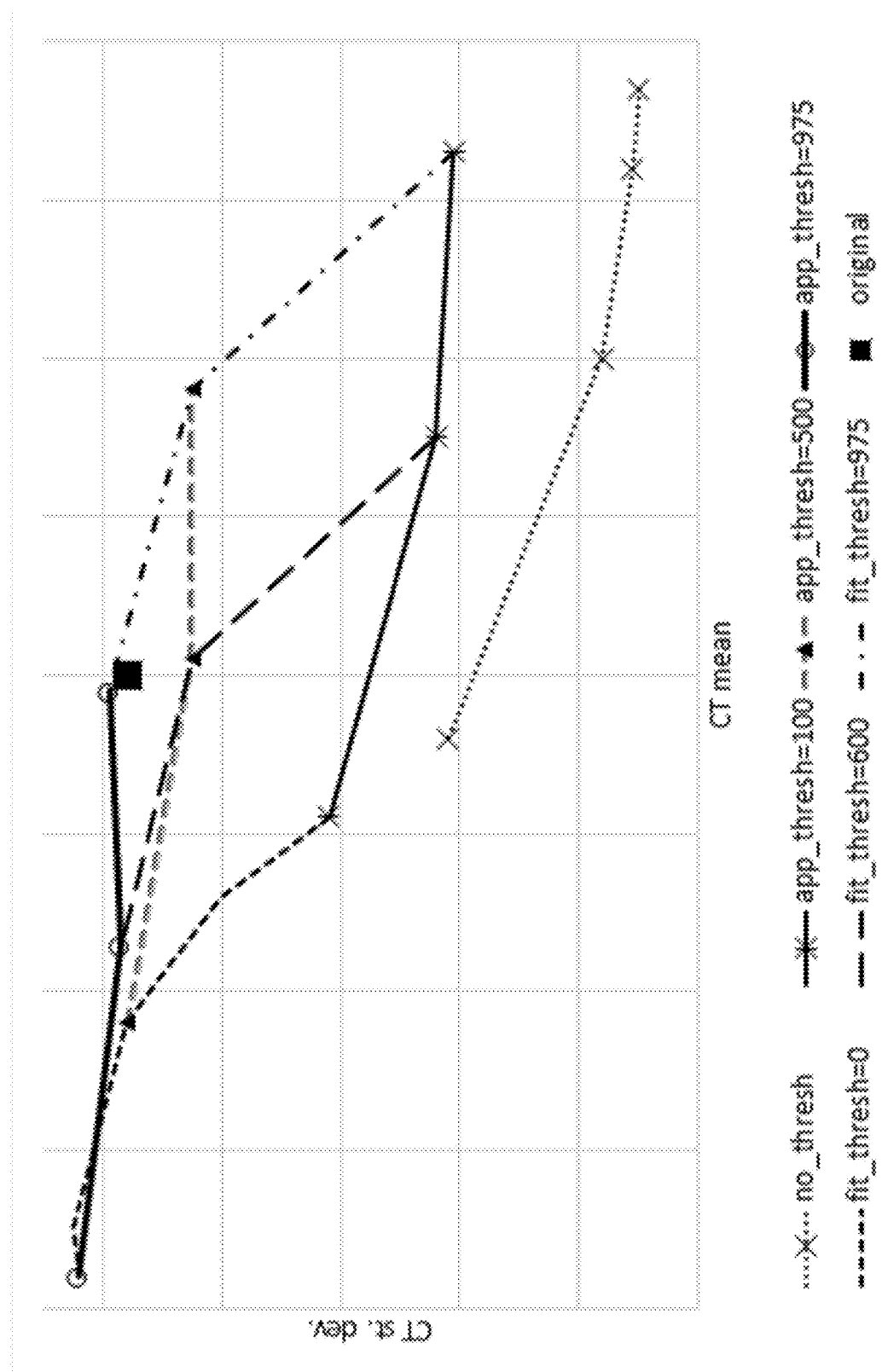
FIG. 19 shows data from Table 5 illustrating trends using different thresholds.

Table 1 (FIG. 18) shows mean and standard deviation of augmented data for various fit thresholds (applied in the fit prior to augmentation) and for various application thresholds. No threshold was used in fitting the augmented data. The original data are from bag #445 (see Table 3 in FIG. 11). FIG. 19 shows data from Table 5 illustrating trends using different thresholds. The large "X" in the upper middle represents the mean and standard deviation of the original data. Table 5 contains all of the mean and standard deviation values resulting from the fit of the augmented data (without using a fit threshold in the analysis) and FIG. 19 plots the same data illustrating the trends of using various thresholds. The mean and standard deviation of the original fit from bag #445 is also shown, and the closest point to the augmented data corresponds to the fit threshold and application threshold both having a value of 975. This demonstrates how Option 5 of the augmentation can result in quite a plurality of results.

It should be pointed out that the standard deviation resulting from the fit of the original data, with or without a fit threshold, is used in Option 3 as well. The effects shown in FIG. 12 would be diminished by use of a fit threshold because it reduces the resulting standard deviation.

Option 6—Contrast Adjustment

Figure 20:
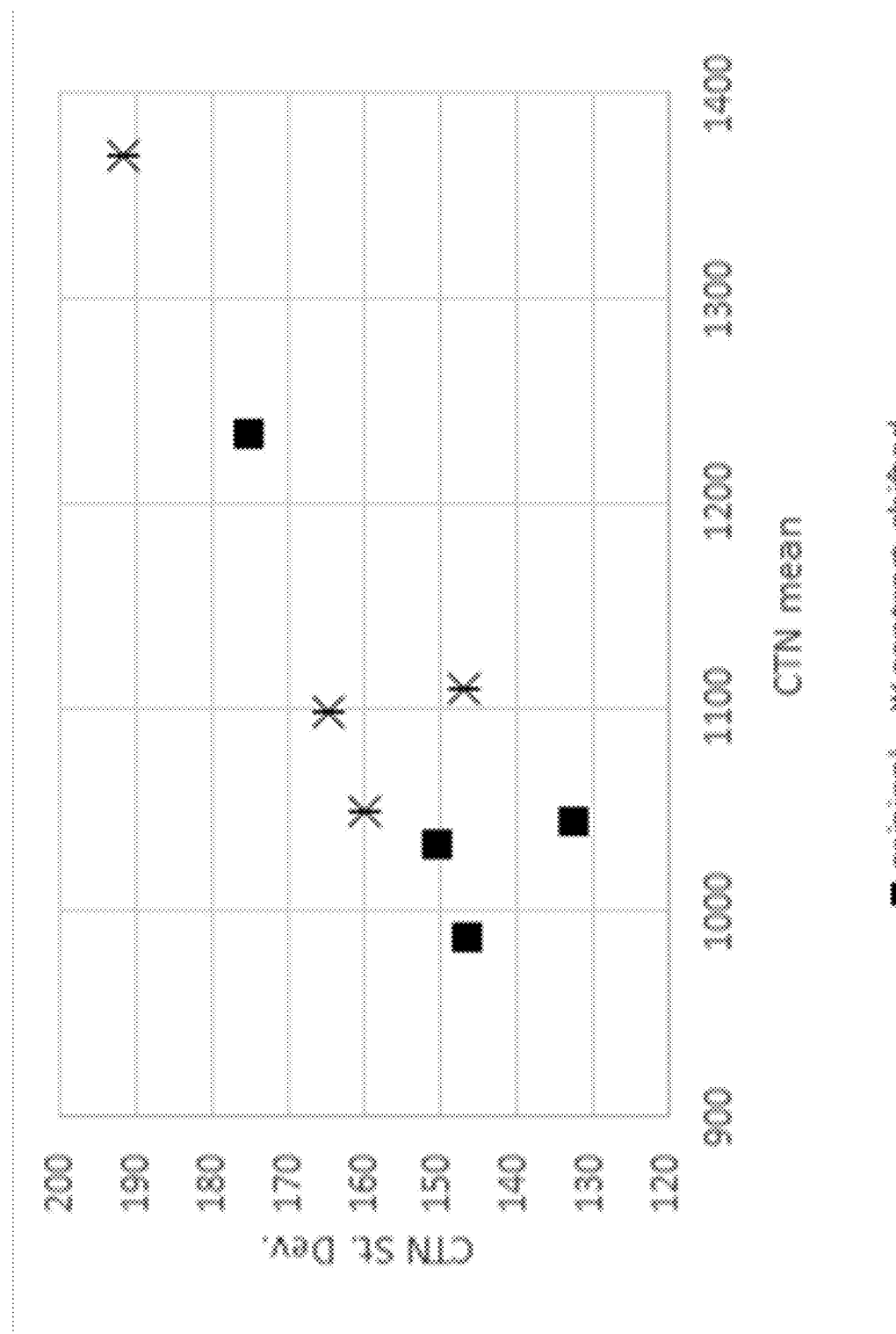
FIG. 20 shows examples of the effect of contrast adjustment.

Option 6 provides a demonstration of a small contrast adjustment to the object data. FIG. 20 shows examples of the effect of contrast adjustment to the object data. Four scans were analyzed, and then re-analyzed after a small shift of the contrast. The effect of the shift was to increase the CT numbers and the standard deviation of the pixel data. The percentage of the change ranged from 6% to 11%. As can be seen in FIG. 20, due to the type of adjustment used, the average CT number of the resulting augmented data increased by a relatively small amount, and the standard deviation also increased. Other types of contrast adjustment were implemented but their effects were too drastic to be considered realistic.

Option 7—Resizing

Another possibility for data augmentation is to change the shape or size of the object. This was implemented using an image resizing function in two dimensions, which uses standard interpolation methods to fill in missing data (the default is bicubic interpolation using a 4×4 neighborhood). The effect in this case should be minimal on the distribution of CT number data. The utility of this option is to enable the study of an explosive detection algorithm as a function of threat size, without actually requiring the threats to be prepared at the augmented values.

Figure 21:
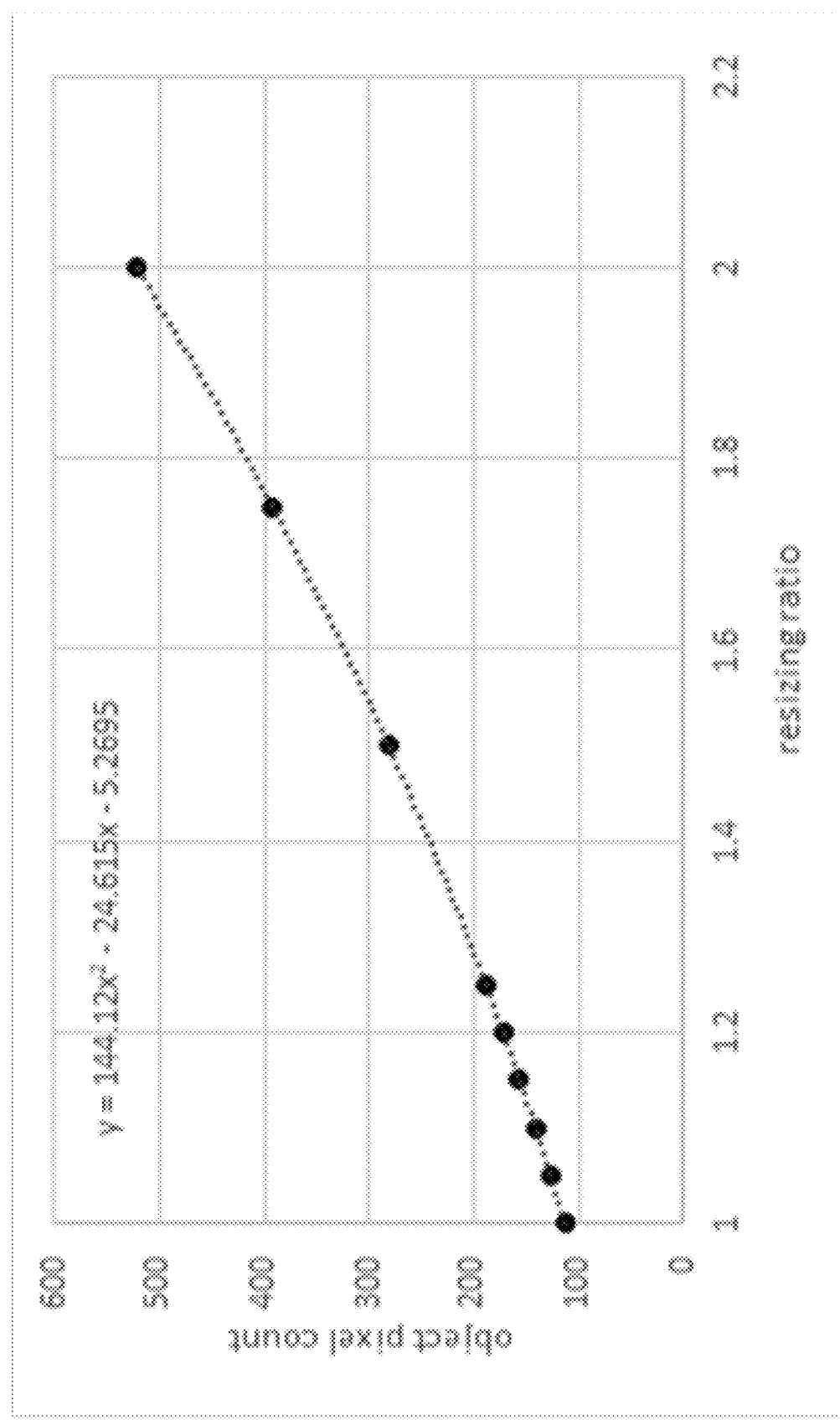
FIG. 21 shows an example of the effects of object resizing on the total number of pixels in the object.

FIG. 21 shows an example of the effect of object resizing on the total number of pixels in the object. In this demonstration GUI, the size of the original object was increased in only two dimensions, and the increase in the number of pixels is shown. For example, if the original cropped image was 100×100 pixels and was increased by 10% in each dimension (resizing ratio=1.1), the augmented image would be 110×110 pixels. The total number of pixels would increase from 10,000 to 12,100, an increase of 21%. This should be the increase in the volume as well, since the number of slices was unchanged. The resizing ratio was increased to 2.0, representing a theoretical volume ratio of 400%. The actual results for a resizing ratio of 1.1 and 2.0 were an increase in total (volume) pixel count of 25% and 360%, respectively, as shown in FIG. 21. (The resizing ratio applies to the area in each two-dimensional slice.)

Figure 22:
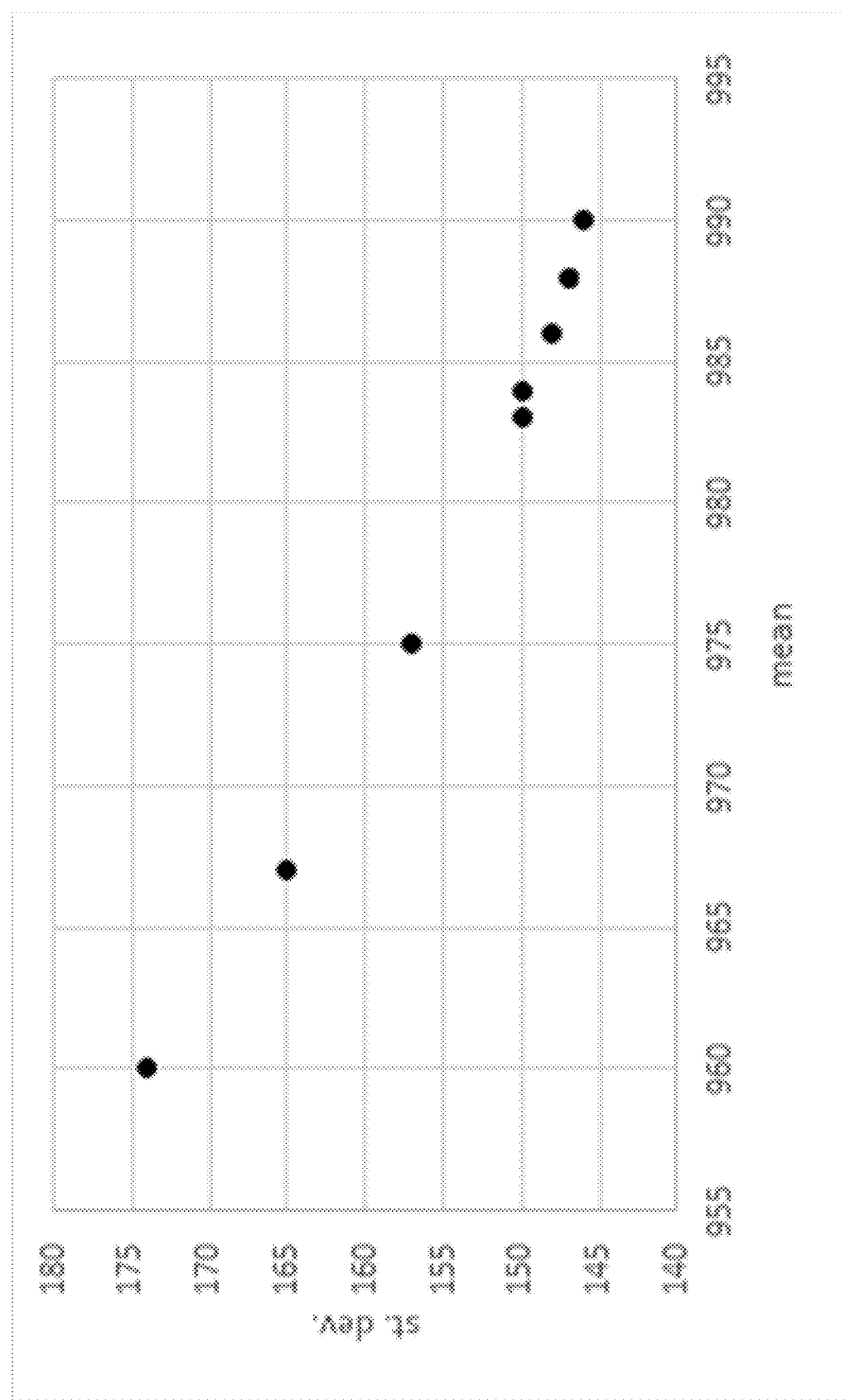
FIG. 22 shows an example of the effect of object resizing on average CT number and standard deviation as a function of resizing.

FIG. 22 shows an example of the effect of object resizing on average CT number and standard deviation as a function of resizing. Unexpectedly, the CT number data also shifted, where the mean CT number decreased with increasing resizing ratio, while the CT number standard deviation increased, as seen in FIG. 22. As the object size is increased, the average CT number decreases while the standard deviation increases. While the shift in mean CT number was minor, reaching 3% with a resizing ratio of 2.0, the standard deviation increased by up to 19%, possibly as a result of the interpolation of pixel values.

Option 8—Object Distortion

The objective with this option was to implement a distortion of the image data with minimal distortion of the shape of the object. This was achieved by using a pincushion type of distortion, and masking using the original shape of the object. The distortion was performed on the cross-sectional slice data, represented by the left image of each pair.

Figure 23A:
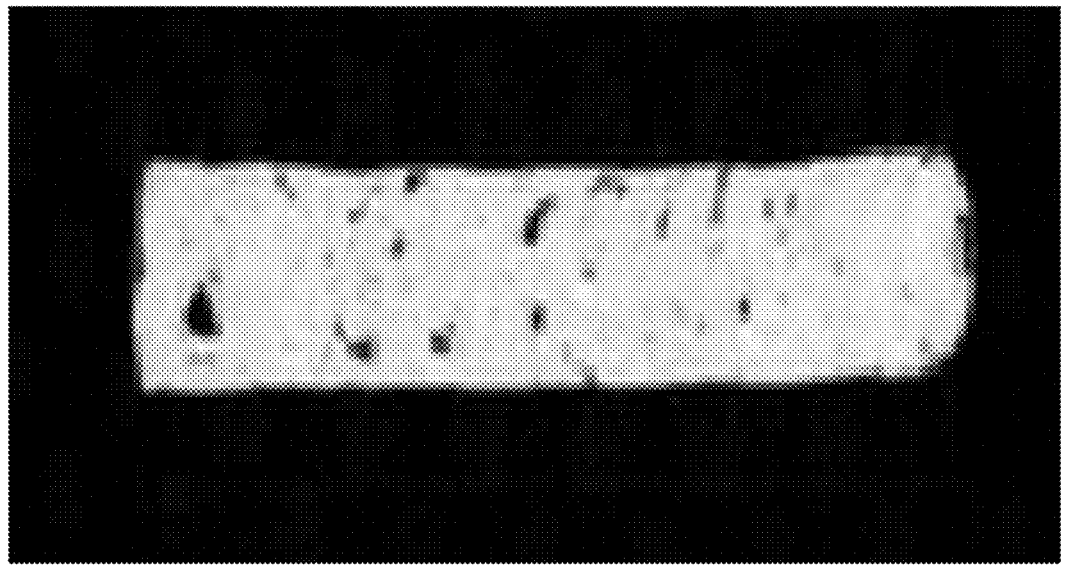
FIGS. 23A and 23B show an example of the effects of object distortion on images.
Figure 23A:
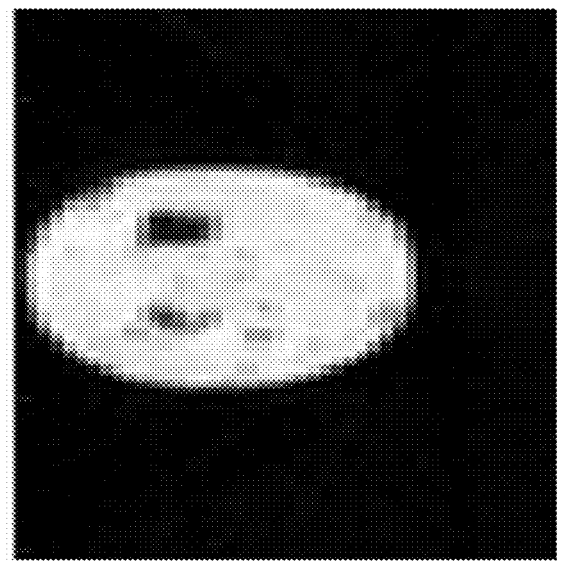
Figure 23B:
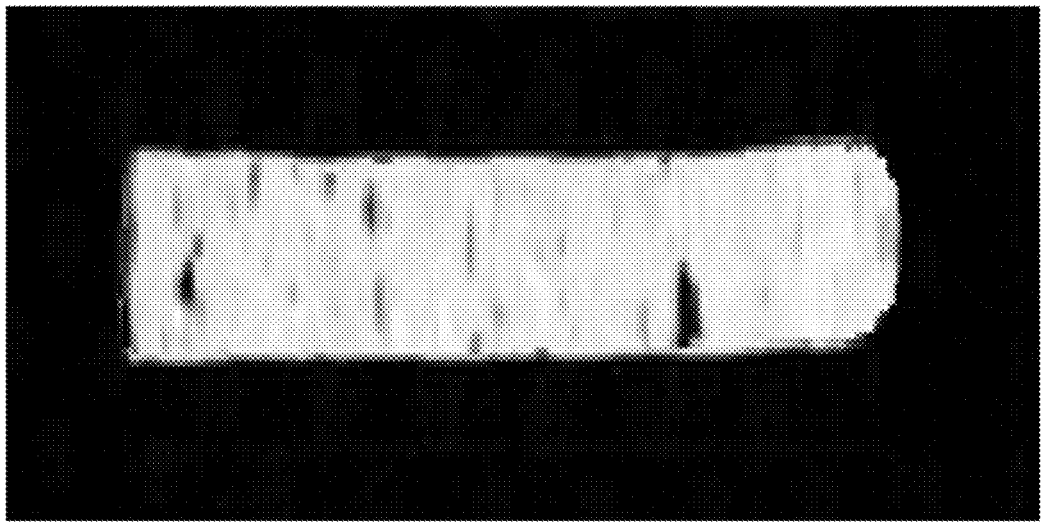
Figure 23B:
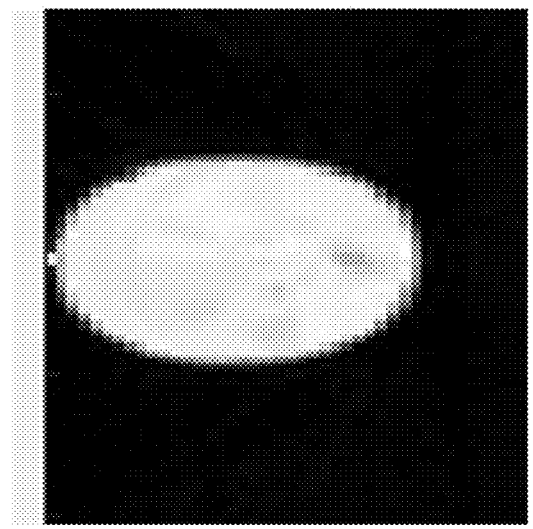

FIGS. 23A and 23B show an example of the effects of object distortion on images: FIG. 23A shows an example slice of one of the scans and FIG. 23B the corresponding slice from the distorted data. The distortion function was applied to each of the slice images, resulting mostly in circular X-Y cross sections of the scanned simulant objects, seen on the left of each pair of images in FIG. 23. On the right of each pair of images is a slice from the corresponding set of X-Z slices.

Figure 24:
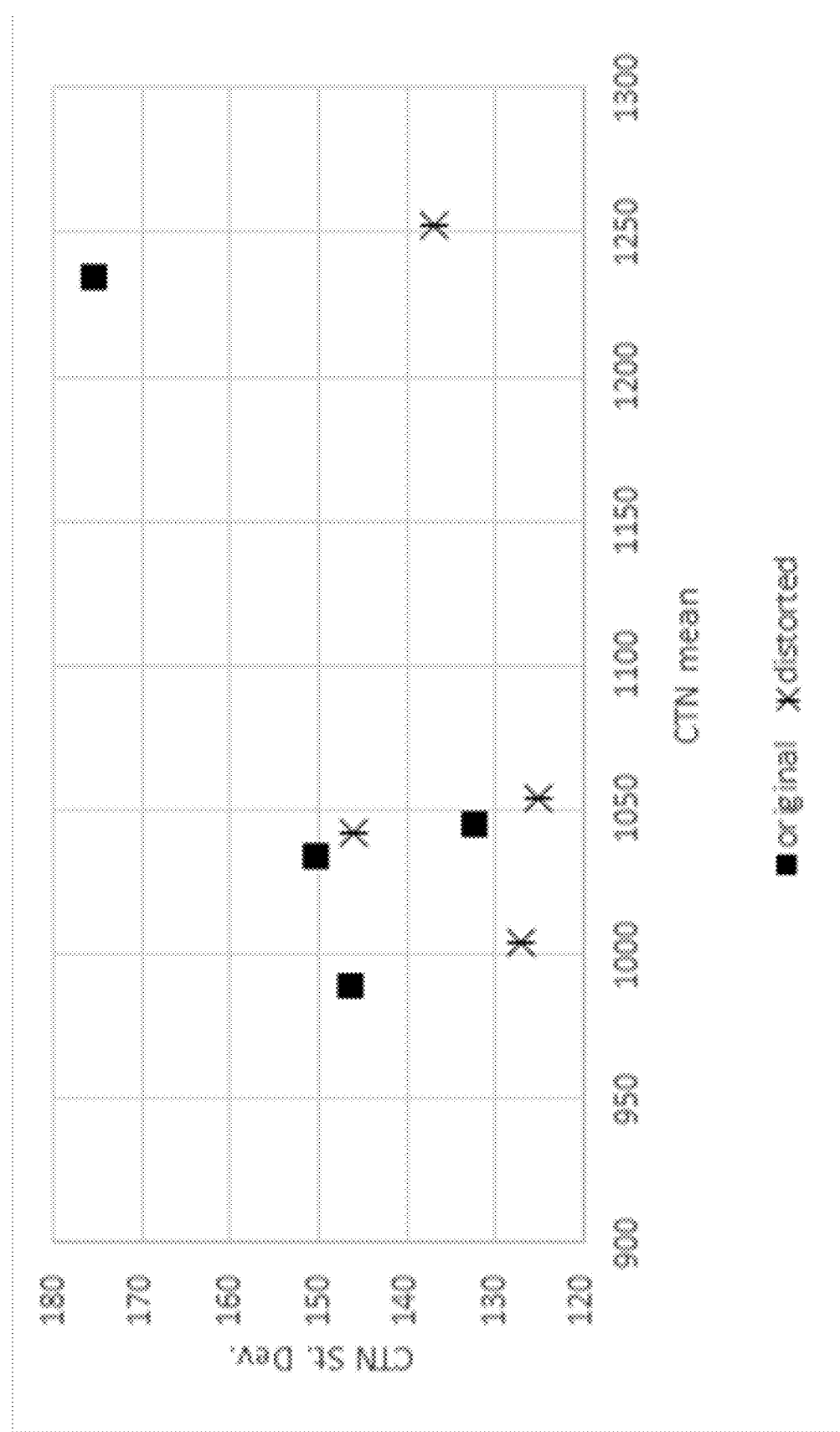
FIG. 24 shows examples of the effects of object distortion on CTN data.

FIG. 24 shows examples of the effects of object distortion on CTN data from four scans. The mean CT number increased slightly, up to 1.4%, while the standard deviation decreased by up to 21.7%. In FIG. 24, the results of distortion are shown for bags #445, 446, 448 and 449. In each case, the mean CT number increased a small amount, up to 1.4%, while the standard deviation decreased more substantially, up to 21.7%. This indicates that the specific distortion applied resulted in a degree of smoothing. However, it is clearly evident during the execution of the distortion process that the images are being severely distorted, which is very different from the smoothing process implemented in Option 3.

Option 9—Texture

After some experimentation, reasonable results were obtained by randomly inserting inclusions, 1 or 4 pixels in size, that had CT numbers chosen randomly between two limits. Those limits allowed for some increase or decrease in the CT number of the chosen pixel. Several augmentation steps were exercised where each step increased the likelihood that a given pixel would be augmented with an inclusion. This approach is only one example of a plurality of possible approaches to inserting random texture, which could be in the form of voids, higher-density chunks, or very high-density metallic objects, for example.

Figure 25:
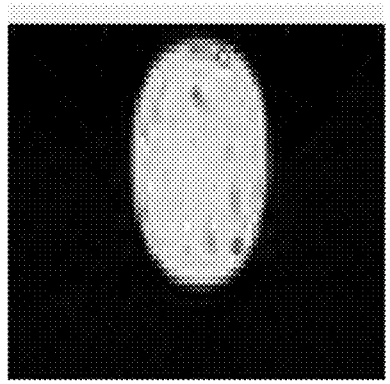
FIG. 25 shows examples of insertion of texture to images, including two repetitions of the minimum amount of texture as seen in (A) and (B) and additional texture added in the final step as seen in (C), and the same examples (D), (E), and (F), with slices along the X-Z plane, with top and bottom images corresponding to the same step and repetition of the augmentation, respectively.
Figure 25:
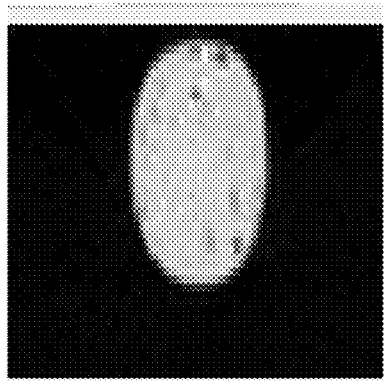
Figure 25:
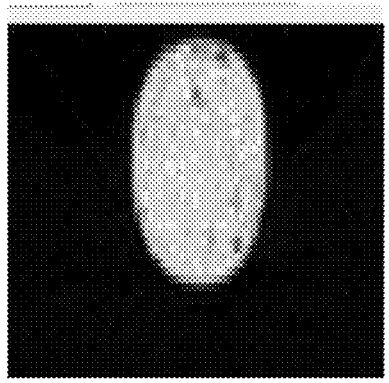
Figure 25:
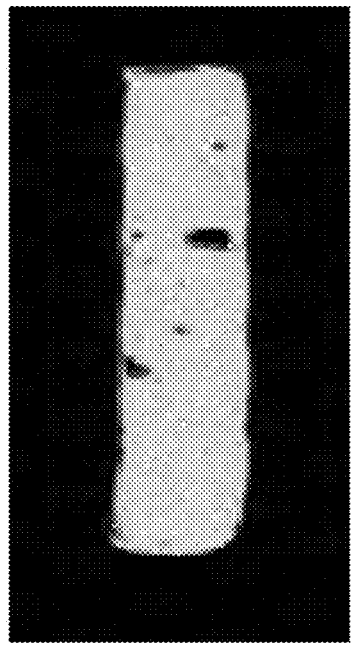
Figure 25:
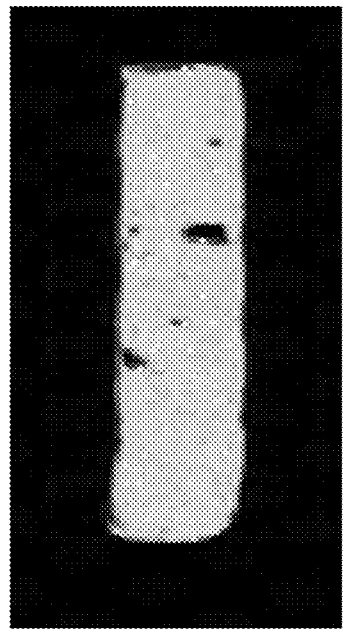
Figure 25:
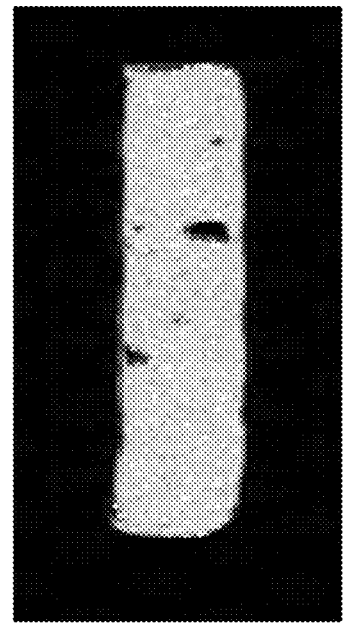

Only Bag #445 was used in the texture augmentation. FIG. 25 shows examples demonstrating insertion of texture to images in the form of higher and lower CT number "particles." On the top row are two repetitions of the minimum amount of texture as seen in (A) and (B), demonstrating that they are different, and additional texture added in the final step as seen in (C). The bottom row shows the same examples (D), (E), and (F), with slices along the X-Z plane, with top and bottom images corresponding to the same step and repetition of the augmentation, respectively.

Figure 26:
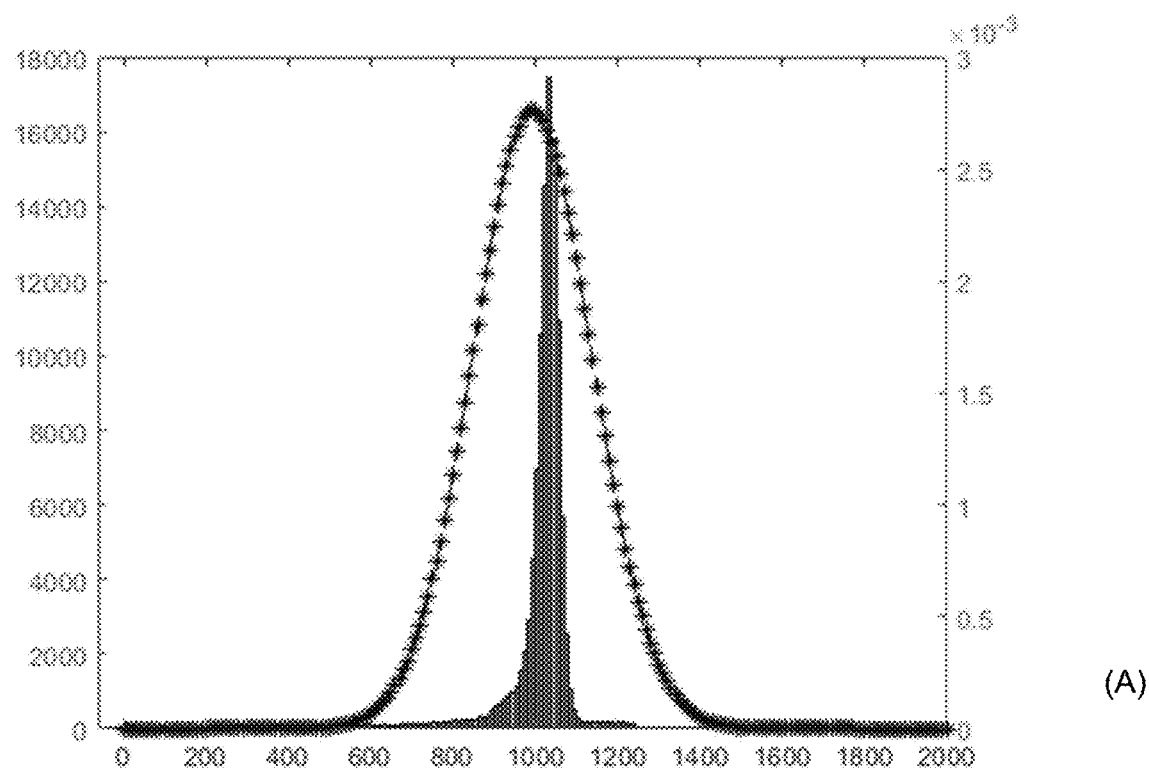
FIG. 26 shows histograms of the entire object volume for the data from the same example shown in FIG. 25, including (A) showing the minimum amount of texture and (B) showing the maximum amount of texture, from this particular example.
Figure 26:
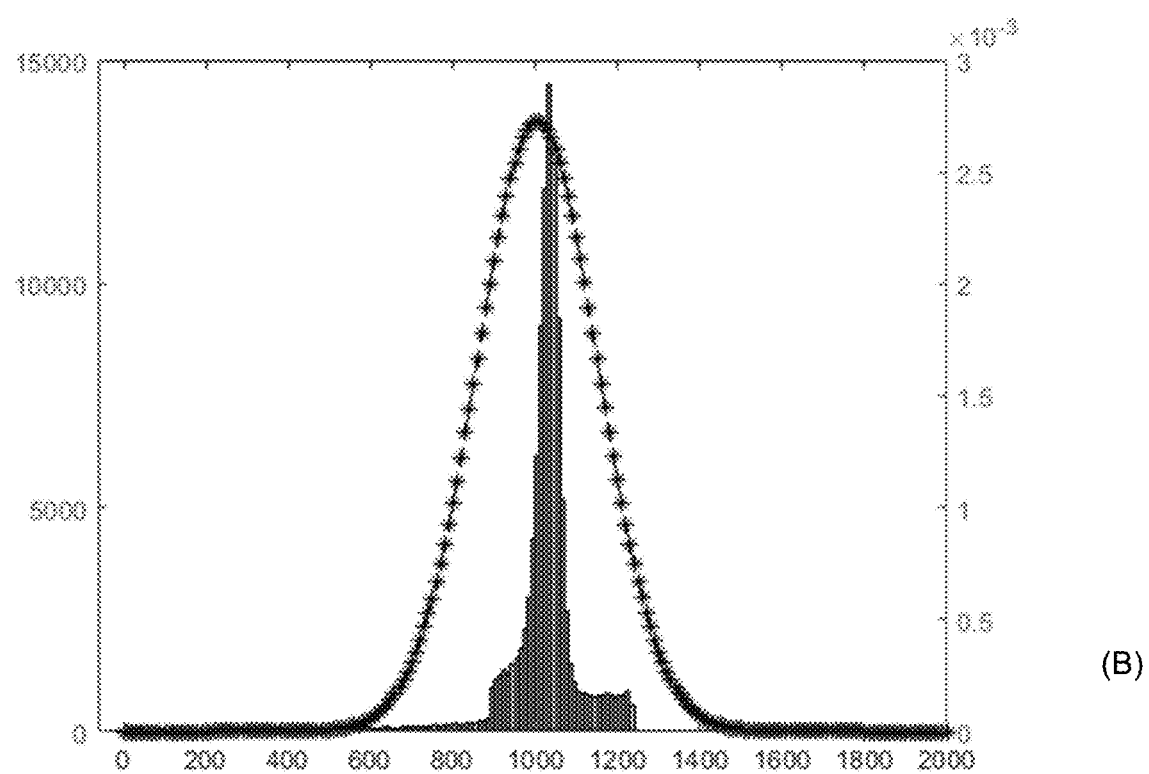

FIG. 26 shows histograms of the entire object volume for the data from the same example shown in FIG. 25. FIG. 26 shows the effect on the histogram of the pixels in the object, where Graph (A) shows the first step of the augmentation (i.e., with minimum inclusions) and Graph (B) shows the final step, with many more inclusions. The effect is to increase the relative proportions of pixels within the range of −10% to +25% of the mean CT number.

Option 10—Gradient

Figure 27:
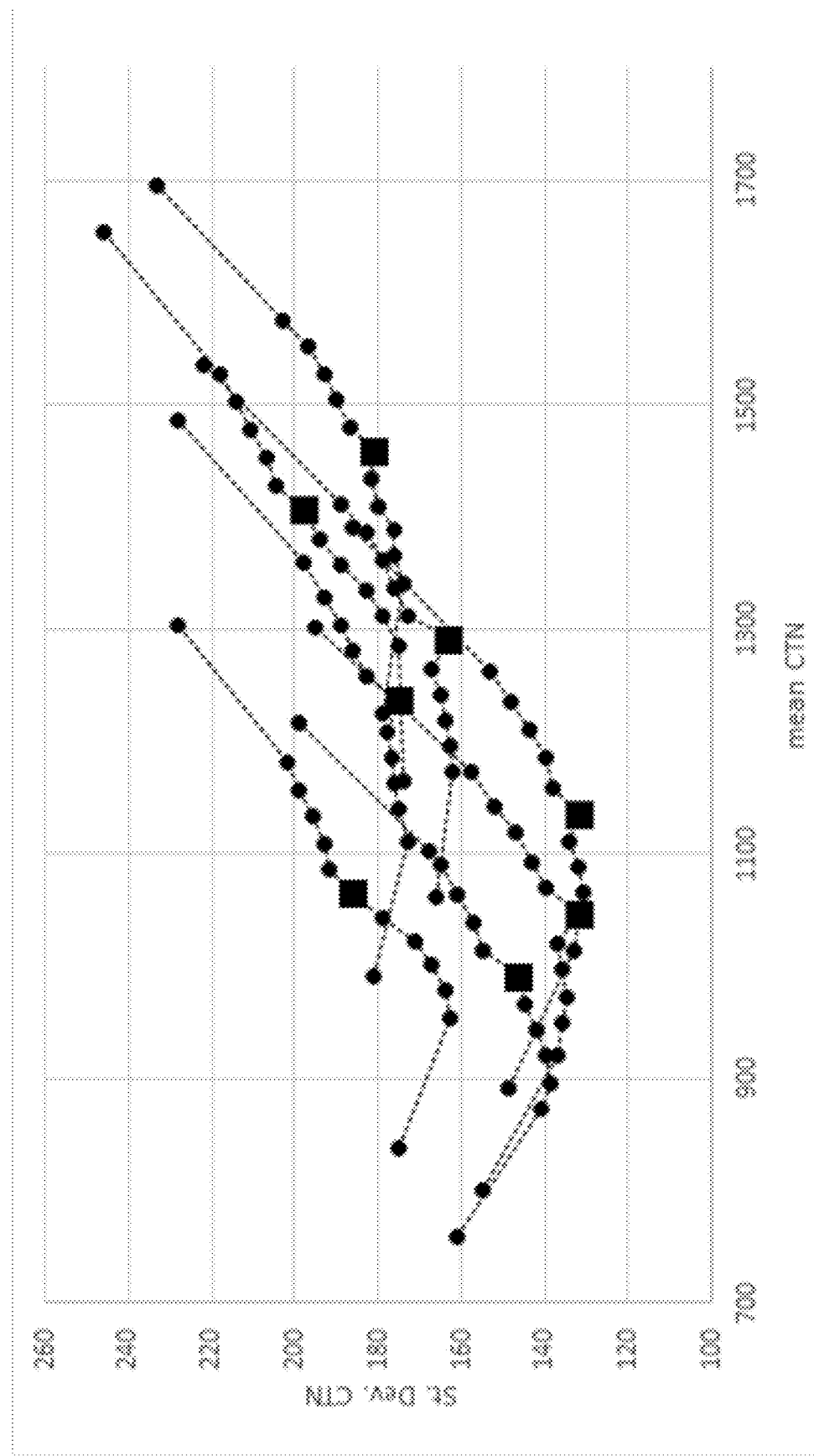
FIG. 27 shows examples of the effects of increasing or decreasing gradient augmentation.

As would be expected, the average CTN for an increasing gradient is higher than without the gradient, and a decreasing gradient results in a lower average CTN. The standard deviation generally increased with increasing gradient. However, with decreasing gradient the standard deviation generally decreased, then increased. The results for eight scans are shown in FIG. 27, illustrating examples of the effects of increasing or decreasing gradient augmentation. Data from the original baggage scans are represented by the large square points. The dashed lines connect points from the same baggage scan augmentation set.

Figure 28A:
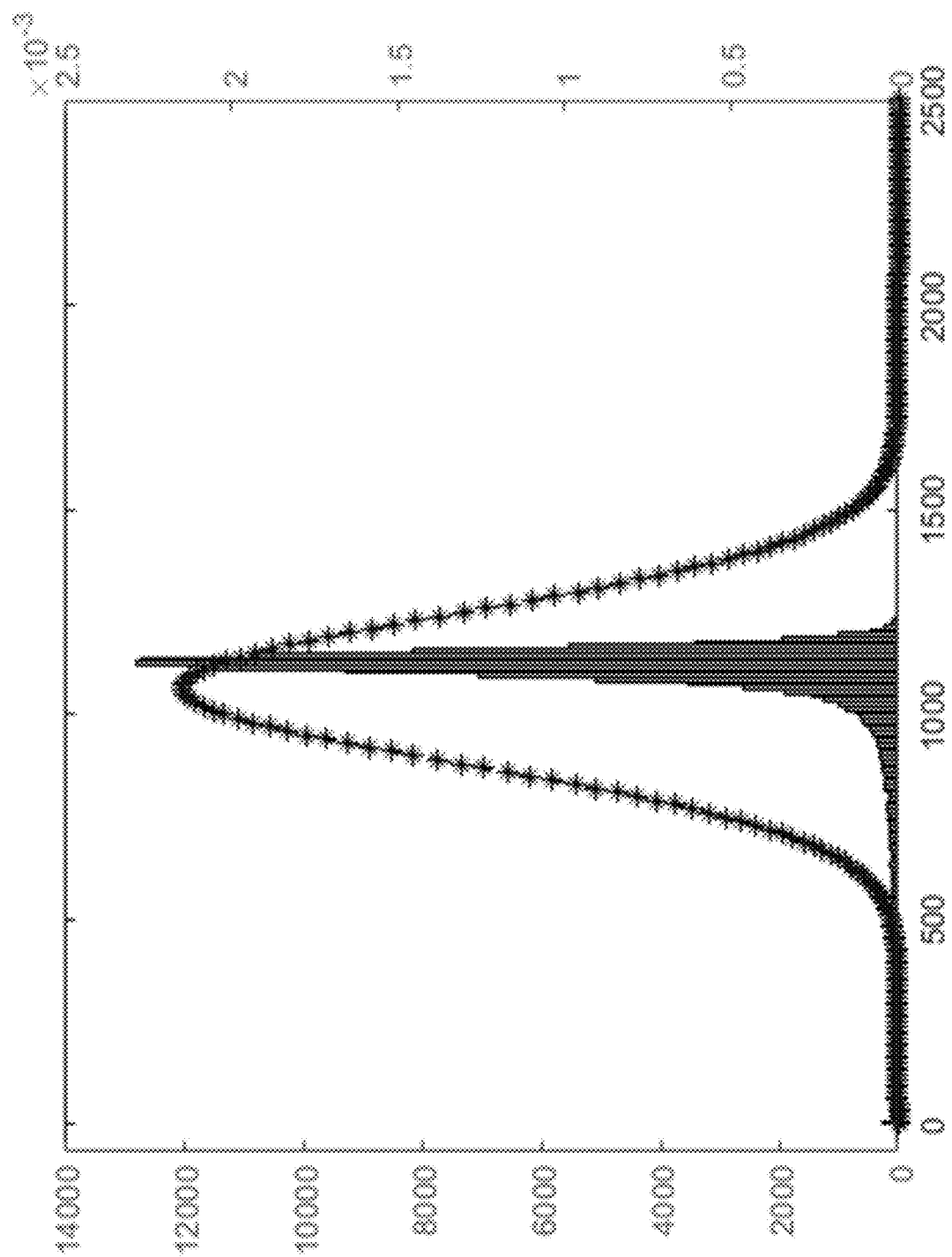
FIGS. 28A-28C show examples of the effects on the CTN histogram.
Figure 28B:
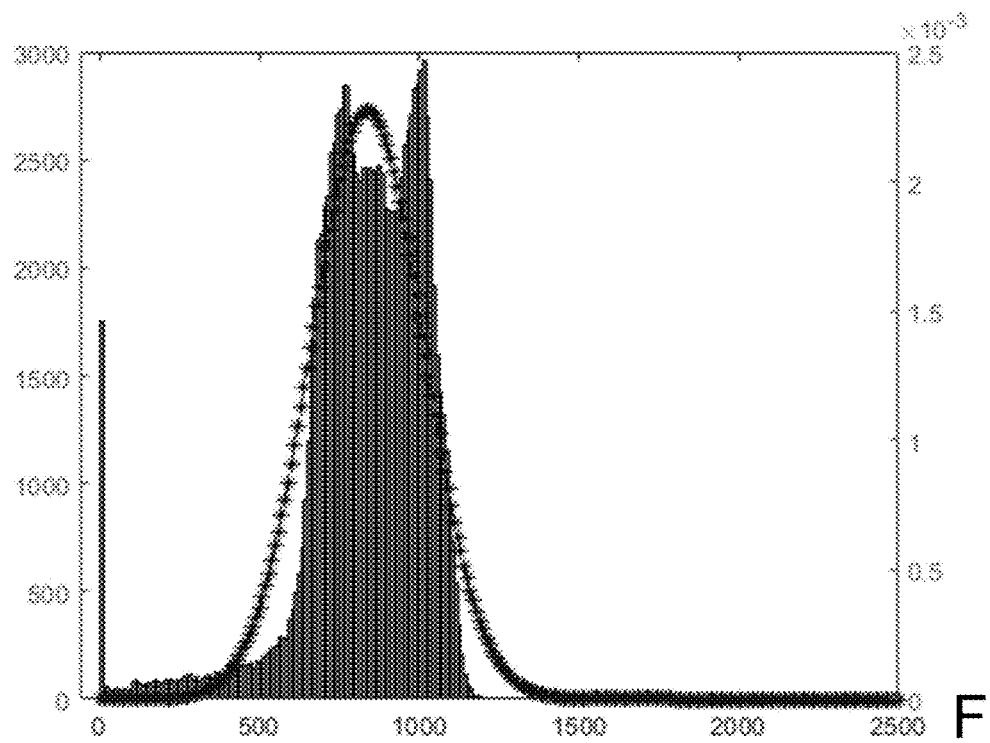
Figure 28C:
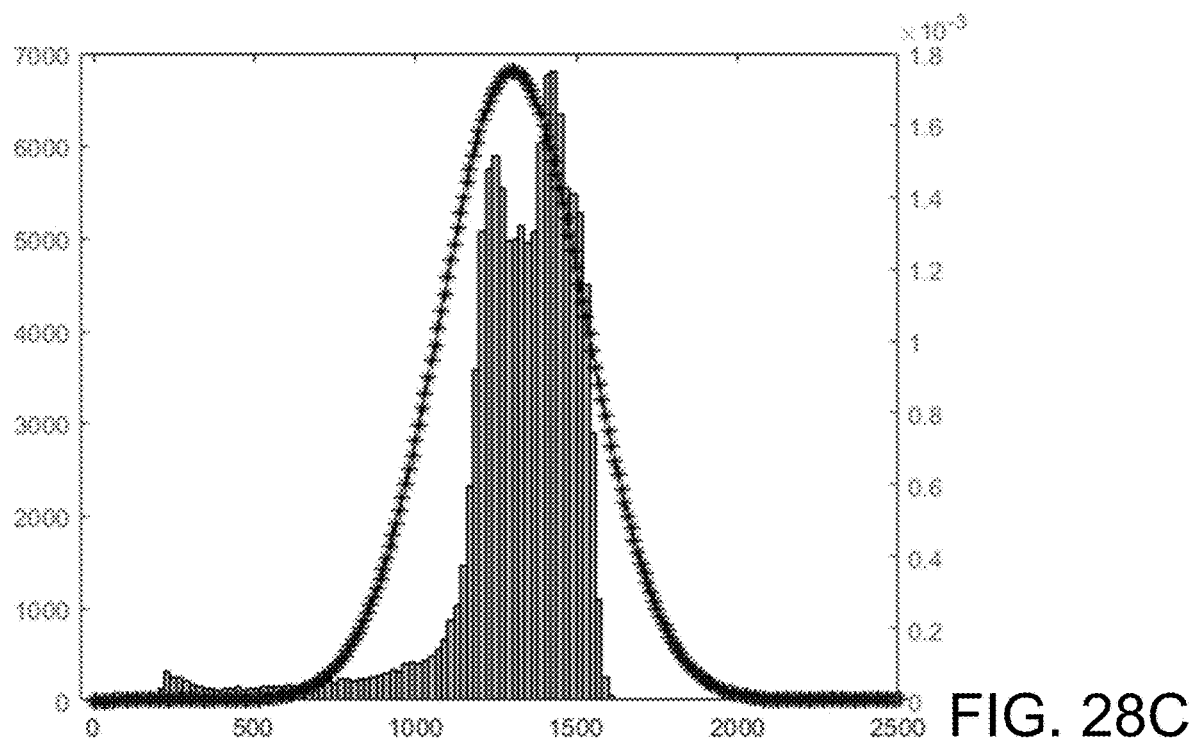

FIGS. 28A-28C show examples of the effects on the CTN histogram of one of the eight original scans. FIG. 28A shows the original CTN histogram, FIG. 28B shows the CTN histogram under the effect of decreasing gradient, and FIG. 28C shows the CTN histogram under the effect of increasing gradient. It is believed the eventual increase in standard deviation with decreasing gradient is due to more and more low-value pixels hitting the floor of possible values (i.e., zero), as seen in FIG. 28B. These augmented histograms correspond to the extreme points for one of the curves shown in FIG. 27. Note the large number of pixels with CTN value of zero in FIG. 28B.

4. Evaluating Detection Response Using Augmented Data

Using a large amount of augmented image files generated using the Augmentation GUI, the detection response of an explosives detection system (EDS) was evaluated using an emulator for that EDS, which had been used to obtain the original images. (An emulator is a separate computer system with display that provides the same verified response as the EDS.) Due to security sensitivity, the system cannot be identified and the results can only be described in general terms.

A typical EDS will produce a detection response for each item that it scans, which will generally be either an "Alarm" or a "Clear." In addition, if there are circumstances which might preclude the EDS from making a determination, such as if the incident radiation was excessively attenuated, then there might be an additional response, such as "Shield" or "Indeterminate."

The EDS that was used in this study demonstrated that it produced "Alarm," "Clear," and "Shield" responses (it is unknown if there are additional potential responses). Using various types of augmentations described in this disclosure, generating hundreds of augmented images, it was demonstrated that one could discover transitions between these different types of responses. For example, by increasing or decreasing average CTN, if the original object resulted in an "Alarm" response, then one could observe a transition to a "Clear" or "Shield" response. One could determine if the detection algorithm was sensitive to image noise, texture, gradients, and overall size, as well.

These types of discoveries or observations would be far more expensive, time-consuming, and dangerous, and potentially impossible, to obtain through the typical process of testing with live explosives, or re-running live explosive data through an emulator. This study has proven that embodiments of this invention can be used with high efficiency to discover aspects of the detection processes within a given EDS to which the test organization might otherwise be blind, since the detection system is, to a large extent, a "black box."

Figure 29:
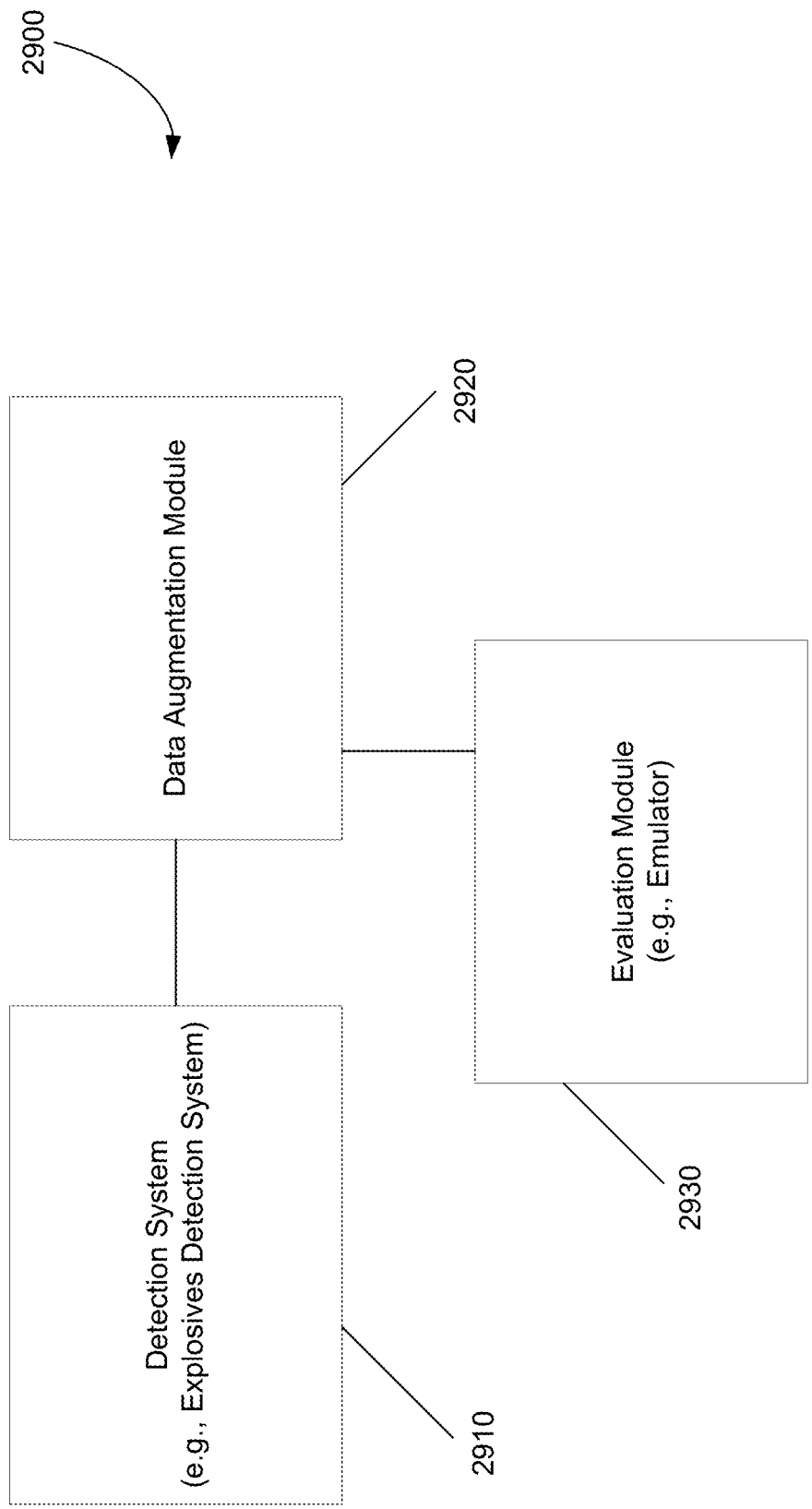
FIG. 29 is a block diagram illustrating a system for testing and evaluating a detection system by data augmentation.

FIG. 29 is a block diagram illustrating a system for testing and evaluating a detection system by data augmentation. The overall system 2900 includes a detection system 2910 such as a security screening system for detecting threat quantities of explosives and other prohibited materials. It may be an EDS as described above and may employ X-ray screening. The detection system 2910 detects a threat object and generates a set of real data which is used to identify the picture or volume elements (pixels or voxels, respectively) of a set of one or more original images corresponding to the threat.

A data augmentation device or module 2920 is executed to process the threat object's pixels that have been identified, to generate new pixel values. For example, the pixel values may be shifted or augmented by smoothing, or image artifacts may be added. The set of one or more original images used by the algorithm is replaced by a set of one or more augmented images. The pixel values in those images can be changed in a variety of ways, where the mean pixel value, the statistical distribution, or the spatial distribution of pixel values, may all be changed by an arbitrary amount. For each image or set of images associated with a single scan of a threat material, a plurality of augmented images can be constructed. The data augmentation device 2920 is configured, based on a starting set of real image data of the set of the one or more original images, to identify elements of the real image data which are picture or volume elements, and perform data augmentation on the identified elements to produce one or more augmented images.

An evaluation module 2930 such as an emulator is executed to analyze the augmented images by the detection algorithm and evaluate the detection response. The set of one or more augmented images is treated as the set of one or more original images. Each of those images may be run through the augmentation process by executing the data augmentation module 2920. The augmented data can be supplemented by additional real data obtained by the detection system 2910, which can then be processed through the augmentation methodology by the data augmentation module 2920 and then evaluated by the evaluation module 2930. As described above, the evaluation module 2930 may be an emulator for a detection system which performs a detection process to obtain a set of one or more original images. The emulator replaces the set of one or more original images with a set of the one or more augmented images, analyzes the set of one or more augmented images using the detection process, and evaluates a detection response of the detection system for each augmented image of the set of one or more augmented images.

Computer System

Figure 30:
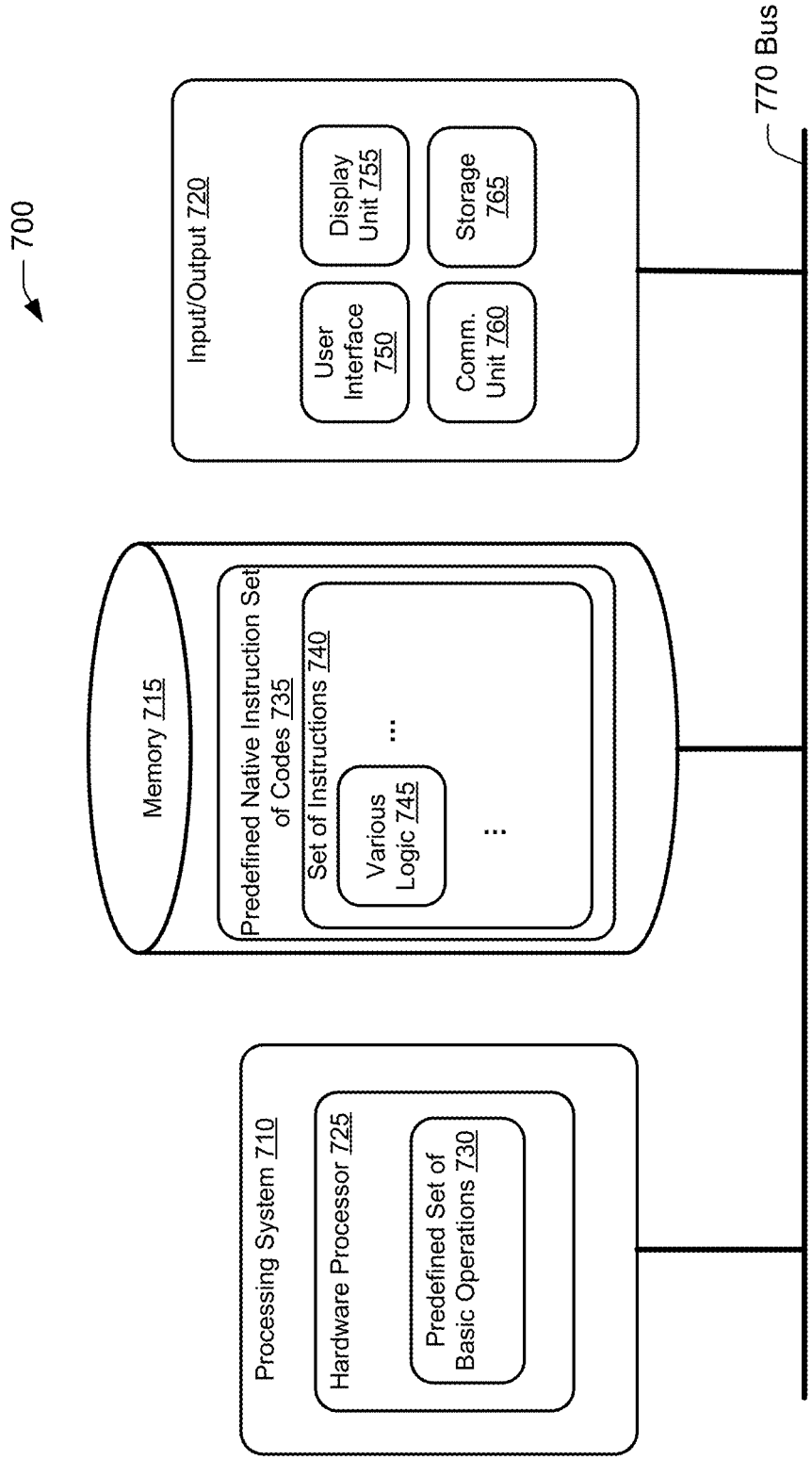
FIG. 30 illustrates a computing system including logic according to an embodiment.

FIG. 30 illustrates a computing system 700 including logic according to an embodiment. The computing system 700 includes a processing system 710 having a hardware processor 725 configured to perform a predefined set of basic operations 730 by loading corresponding ones of a predefined native instruction set of codes 735 as stored in the memory 715. The computing system 700 further includes input/output 720 having user interface 750, display unit 755, communication unit 760, and storage 765.

The memory 715 is accessible to the processing system 710 via the bus 770. The memory 715 includes the predefined native instruction set of codes 735, which constitute a set of instructions 740 selectable for execution by the hardware processor 725. In an embodiment, the set of instructions 740 include logic 745 representing various processor logic and/or modules. An example of such logic 745 is set forth in greater detail with respect to the flow diagram illustrated in FIG. 1. Each of the above-mentioned algorithms (e.g., MMWI, neutron imaging, and other detection algorithms and other imaging algorithms) can be a separate system or a module in an overall computer system 700. The various logic 745 is stored in the memory 715 and comprises instructions 740 selected from the predefined native instruction set of codes 735 of the hardware processor 725, adapted to operate with the processing system 710 to implement the process or processes of the corresponding logic 745.

A hardware processor may be thought of as a complex electrical circuit that is configured to perform a predefined set of basic operations in response to receiving a corresponding basic instruction selected from a predefined native instruction set of codes. The predefined native instruction set of codes is specific to the hardware processor; the design of the processor defines the collection of basic instructions to which the processor will respond, and this collection forms the predefined native instruction set of codes. A basic instruction may be represented numerically as a series of binary values, in which case it may be referred to as a machine code. The series of binary values may be represented electrically, as inputs to the hardware processor, via electrical connections, using voltages that represent either a binary zero or a binary one. These voltages are interpreted as such by the hardware processor. Executable program code may therefore be understood to be a set of machine codes selected from the predefined native instruction set of codes. A given set of machine codes may be understood, generally, to constitute a module. A set of one or more modules may be understood to constitute an application program or "app." An app may interact with the hardware processor directly or indirectly via an operating system. An app may be part of an operating system.

A computer program product is an article of manufacture that has a computer-readable medium with executable program code that is adapted to enable a processing system to perform various operations and actions. Non-transitory computer-readable media may be understood as a storage for the executable program code. Whereas a transitory computer-readable medium holds executable program code on the move, a non-transitory computer-readable medium is meant to hold executable program code at rest. Non-transitory computer-readable media may hold the software in its entirety, and for longer duration, compared to transitory computer-readable media that holds only a portion of the software and for a relatively short time. The term, "non-transitory computer-readable medium," specifically excludes communication signals such as radio frequency signals in transit. The following forms of storage exemplify non-transitory computer-readable media: removable storage such as a USB disk, a USB stick, a flash disk, a flash drive, a thumb drive, an external SSD, a compact flash card, an SD card, a diskette, a tape, a compact disc, an optical disc; secondary storage such as an internal hard drive, an internal SSD, internal flash memory, internal non-volatile memory, internal DRAM, ROM, RAM, and the like; and the primary storage of a computer system.

Different terms may be used to express the relationship between executable program code and non-transitory computer-readable media. Executable program code may be written on a disc, embodied in an application-specific integrated circuit, stored in a memory chip, or loaded in a cache memory, for example. Herein, the executable program code may be said, generally, to be "in" or "on" a computer-readable media. Conversely, the computer-readable media may be said to store, to include, to hold, or to have the executable program code.

The inventive concepts taught by way of the examples discussed above are amenable to modification, rearrangement, and embodiment in several ways. For example, this invention may be used for non-imaging applications such as those involving collection of spectra. It was not possible to exercise this methodology with any system that collected spectral data. These systems either did not have emulators or stable detection algorithms or were still in the developmental stage. Nonetheless, persons of ordinary skill in the art can adapt the present methodology to the collection of spectra or other non-imaging applications when the technologies are more fully developed and emulators become available for those systems.

Accordingly, although the present disclosure has been described with reference to specific embodiments and examples, persons skilled in the art will recognize that changes may be made in form and detail without departing from the spirit and scope of the disclosure.

Certain attributes, functions, steps of methods, or sub-steps of methods described herein may be associated with physical structures or components, such as a module of a physical device that, in implementations in accordance with this disclosure, make use of instructions (e.g., computer executable instructions) that are embodied in hardware, such as an application specific integrated circuit, or that may cause a computer (e.g., a general-purpose computer) executing the instructions to have defined characteristics. There may be a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an API. In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

The claims define the invention and form part of the specification. Limitations from the written description are not to be read into the claims.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not be taken as limiting or restricting the systems, techniques, approaches, methods, devices to those appearing in any section. Rather, the teachings and disclosures herein can be combined, rearranged, with other portions of this disclosure and the knowledge of one of ordinary skill in the art. It is the intention of this disclosure to encompass and include such variation.

The indication of any elements or steps as "optional" does not indicate that all other or any other elements or steps are mandatory. The claims define the invention and form part of the specification. Limitations from the written description are not to be read into the claims.

What is claimed is:

1. A method comprising:
    based on a starting set of real image data of a set of one or more original three-dimensional (3D) images obtained using a detection process of a detection system, identifying elements of the real image data which include two-dimensional (2D) picture elements or 3D volume elements or both 2D picture and 3D volume elements;
    performing data augmentation on the identified elements to produce a set of one or more augmented 3D images;
    analyzing the set of one or more augmented 3D images using the detection process; and
    evaluating a detection response of the detection system for each augmented 3D image of the set of one or more augmented 3D images.

2. The method of claim 1, further comprising:
    treating the set of one or more augmented 3D images as a set of one or more previously augmented 3D images;
    performing further data augmentation, on elements of the set of one or more previously augmented 3D images which include 2D picture elements or 3D volume elements or both 2D picture and 3D volume elements, to produce a set of one or more further augmented 3D images;
    analyzing the set of one or more further augmented 3D images using the detection process; and
    evaluating a detection response of the detection system for each further augmented 3D image of the set of one or more further augmented 3D images.

3. The method of claim 1, further comprising:
    supplementing the set of one or more augmented 3D images with additional real image data of one or more real 3D images and identifying 2D picture elements or 3D volume elements or both 2D picture and 3D volume elements of the additional real image data;
    treating the set of one or more augmented 3D images as a set of one or more previously augmented 3D images;
    performing further data augmentation, on elements of the set of one or more previously augmented 3D images which include 2D picture elements or 3D volume elements or both 2D picture and 3D volume elements, supplemented with the 2D picture elements or the 3D volume elements or both the 2D picture and 3D volume elements of the additional real image data, to produce a set of one or more further augmented 3D images;
    analyzing the set of one or more further augmented 3D images using the detection process; and
    evaluating a detection response of the detection system for each further augmented 3D image of the set of one or more further augmented 3D images.

4. The method of claim 1,
wherein the detection process is used to detect an object; and
wherein performing data augmentation comprises simulating a change of one or more characteristics of the object to test an effect on detection.

5. The method of claim 1, wherein the detection process is used to detect an object to produce an object detection response out of a plurality of object detection responses, the method further comprising:
treating the set of one or more augmented 3D images as a set of one or more previously augmented 3D images;
performing further data augmentation, on elements of the set of one or more previously augmented 3D images which include 2D picture elements or 3D volume elements or both 2D picture and 3D volume elements, to produce a set of one or more further augmented 3D images;
analyzing the set of one or more further augmented 3D images using the detection process; and
evaluating a detection response of the detection system for each further augmented 3D image of the set of one or more further augmented 3D images; and
treating the set of one or more further augmented 3D images as the set of one or more previously augmented 3D images and repeating the performing, analyzing, and evaluating steps of this claim, until the object detection response produced is changed from a first object detection response to a second object detection response, indicating a transition between different types of object detection responses, if the object detection response does not indicate the transition prior to the repeating.

6. The method of claim 1,
wherein performing data augmentation comprises inserting image texture or artifacts artificially into the detection process to test an effect on detection.

7. The method of claim 1,
wherein performing data augmentation comprises distorting the set of one or more original 3D images to test an effect on detection.

8. The method of claim 7,
wherein distorting the set of one or more original 3D images comprises distorting at least one of color, shape, or size of the set of one or more original 3D images.

9. The method of claim 1,
wherein analyzing the set of one or more augmented 3D images using the detection process and evaluating the detection response of the detection system comprise analyzing the set of one or more augmented 3D images and evaluating the detection response of the detection system using an emulator for the detection system which was used to obtain the one or more original 3D images, for each augmented 3D image of the set of one or more augmented 3D images.

10. A system comprising:
an emulator for a detection system which performs a detection process to obtain a set of one or more original three-dimensional (3D) images; and
a data augmentation device configured, based on a starting set of real image data of the set of one or more original 3D images, to identify elements of the real image data which include two-dimensional (2D) picture elements or 3D volume elements or both 2D picture and 3D volume elements, and perform data augmentation on the identified elements to produce a set of one or more augmented 3D images;
the emulator being configured to analyze the set of one or more augmented 3D images using the detection process, and evaluate a detection response of the detection system for each augmented 3D image of the set of one or more augmented 3D images.

11. The system of claim 10,
wherein the data augmentation device is configured to treat the set of one or more augmented 3D images as a set of one or more previously augmented 3D images, and perform further data augmentation, on elements of the set of one or more previously augmented 3D images which include 2D picture elements or 3D volume elements or both 2D picture and 3D volume elements, to produce a set of one or more further augmented 3D images; and
wherein the emulator is configured to analyze the set of one or more further augmented 3D images using the detection process, and evaluate a detection response of the detection system for each further augmented 3D image of the set of one or more further augmented 3D images.

12. The system of claimer 10, wherein the data augmentation device is configured to:
supplement the set of one or more augmented 3D images with additional real image data and identify 2D picture elements or 3D volume elements or both 2D picture and 3D volume elements of the additional real image data, treat the set of one or more augmented 3D images as a set of one or more previously augmented 3D images, and perform further data augmentation, on elements of the set of one or more previously augmented 3D images which include 2D picture elements or 3D volume elements or both 2D picture and 3D volume elements, supplemented with the 2D picture elements or the 3D volume elements or both the 2D picture and 3D volume elements of the additional real image data, to produce a set of one or more further augmented 3D images; and
wherein the emulator is configured to analyze the set of one or more further augmented 3D images using the detection process, and evaluate a detection response of the detection system for each further augmented 3D image of the set of one or more further augmented 3D images.

13. The system of claim 10,
wherein the detection process is used to detect an object; and
wherein performing data augmentation comprises simulating a change of one or more characteristics of the object to test an effect on detection.

14. The system of claim 10,
wherein the detection process is used to detect an object to produce an object detection response out of a plurality of object detection responses;
wherein the data augmentation device is configured to treat the set of one or more augmented 3D images as a set of one or more previously augmented 3D images, and perform further data augmentation, on elements of the set of one or more previously augmented 3D images which include 2D picture elements or 3D volume elements or both 2D picture and 3D volume elements, to produce a set of one or more further augmented 3D images;
wherein the emulator is configured to analyze the set of one or more further augmented 3D images using the detection process, and evaluate a detection response of the detection system for each further augmented 3D image of the set of one or more further augmented 3D images; and wherein the data augmentation device is configured to treat the set of one or more further augmented 3D images as the set of one or more previously augmented 3D images and repeat the performing step of this claim and the emulator is configured to repeat the analyzing and evaluating steps of this claim, until the object detection response produced is changed from a first object detection response to a second object detection response, indicating a transition between different types of object detection responses, if the object detection response does not indicate the transition prior to the repeating.

15. A non-transitory computer readable storage medium having stored thereon software instructions that are executable by a processor to cause the processor to perform the following:

based on a starting set of real image data of a set of one or more original three-dimensional (3D) images obtained using a detection process of a detection system, identifying elements of the real image data which include two-dimensional (2D) picture elements or 3D volume elements or both 2D picture and 3D volume elements;

performing data augmentation on the identified elements to produce a set of one or more augmented 3D images;

analyzing the set of one or more augmented 3D images using the detection process; and evaluating a detection response of the detection system for each augmented 3D image of the set of one or more augmented 3D images.

16. The non-transitory computer readable storage medium of claim 15 having stored thereon software instructions that are executable by the processor to cause the processor to perform the following:

treating the set of one or more augmented 3D images as a set of one or more previously augmented 3D images;

performing further data augmentation, on elements of the set of one or more previously augmented 3D images which include 2D picture elements or 3D volume elements or both 2D picture and 3D volume elements, to produce a set of one or more further augmented 3D images;

analyzing the set of one or more further augmented 3D images using the detection process; and evaluating a detection response of the detection system for each further augmented 3D image of the set of one or more further augmented 3D images.

17. The non-transitory computer readable storage medium of claim 15 having stored thereon software instructions that are executable by the processor to cause the processor to perform the following:

supplementing the set of one or more augmented 3D images with additional real image data and identifying 2D picture elements or 3D volume elements or both 2D picture and 3D volume elements of the additional real image data;

treating the set of one or more augmented 3D images as a set of one or more previously augmented 3D images;

performing further data augmentation, on elements of the set of one or more previously augmented 3D images which include 2D picture elements or 3D volume elements or both 2D picture and 3D volume elements, supplemented with the 2D picture elements or the 3D volume elements or both the 2D picture and 3D volume elements of the additional real image data, to produce a set of one or more further augmented 3D images;

analyzing the set of one or more further augmented 3D images using the detection process; and evaluating a detection response of the detection system for each further augmented 3D image of the set of one or more further augmented 3D images.

18. The non-transitory computer readable storage medium of claim 15 having stored thereon software instructions that are executable by the processor, wherein the detection process is used to detect an object; and wherein performing data augmentation comprises simulating a change of one or more characteristics of the object to test an effect on detection.

19. The non-transitory computer readable storage medium of claim 15, wherein the detection process is used to detect an object to produce an object detection response out of a plurality of object detection responses, the non-transitory computer readable storage medium having stored thereon software instructions that are executable by the processor to cause the processor to perform the following:

treating the set of one or more augmented 3D images as a set of one or more previously augmented 3D images;

performing further data augmentation, on elements of the set of one or more previously augmented 3D images which include 2D picture elements or 3D volume elements or both 2D picture and 3D volume elements, to produce a set of one or more further augmented 3D images;

analyzing the set of one or more further augmented 3D images using the detection process; and evaluating a detection response of the detection system for each further augmented 3D image of the set of one or more further augmented 3D images; and treating the set of one or more further augmented 3D images as the set of one or more previously augmented 3D images and repeating the performing, analyzing, and evaluating steps of this claim, until the object detection response produced is changed from a first object detection response to a second object detection response, indicating a transition between different types of object detection responses, if the object detection response does not indicate the transition prior to the repeating.

20. The non-transitory computer readable storage medium of claim 15 having stored thereon software instructions that are executable by the processor to cause the processor to perform data augmentation comprising at least one of the following:

inserting image texture or artifacts artificially into the detection process to test an effect on detection; or distorting the set of one or more original 3D images to test an effect on detection.

21. The method of claim 1, wherein the identified elements of the real image data include 2D slices of the set of one or more original 3D images and wherein elements of the set of one or more augmented 3D images include 2D slices of the set of one or more augmented 3D images;

wherein performing data augmentation on the identified elements comprises performing data augmentation on the 2D slices of the set of one or more original 3D images;

wherein analyzing the set of one or more augmented 3D images comprises analyzing the 2D slices of the set of one or more augmented 3D images; and wherein the detection response of the detection system is evaluated based on analyzing the set of one or more augmented 3D images.

22. The system of claim 10,
wherein the identified elements of the real image data include 2D slices of the set of one or more original 3D images and wherein elements of the set of one or more augmented 3D images include 2D slices of the set of one or more augmented 3D images;
wherein performing data augmentation on the identified elements comprises performing data augmentation on the 2D slices of the set of one or more original 3D images;
wherein analyzing the set of one or more augmented 3D images comprises analyzing the 2D slices of the set of one or more augmented 3D images; and
wherein the detection response of the detection system is evaluated based on analyzing the set of one or more augmented 3D images.

23. The non-transitory computer readable storage medium of claim 15 having stored thereon software instructions that are executable by the processor,
wherein the identified elements of the real image data include 2D slices of the set of one or more original 3D images and wherein elements of the set of one or more augmented 3D images include 2D slices of the set of one or more augmented 3D images;
wherein performing data augmentation on the identified elements comprises performing data augmentation on the 2D slices of the set of one or more original 3D images;
wherein analyzing the set of one or more augmented 3D images comprises analyzing the 2D slices of the set of one or more augmented 3D images; and
wherein the detection response of the detection system is evaluated based on analyzing the set of one or more augmented 3D images.

* * * * *